United States Patent
Ghaderi

(10) Patent No.: US 10,673,364 B2
(45) Date of Patent: Jun. 2, 2020

(54) MOTOR CONTROL METHOD, MOTOR DRIVE SYSTEM, AND ELECTRIC POWER STEERING SYSTEM

(71) Applicant: Nidec Corporation, Kyoto (JP)

(72) Inventor: Ahmad Ghaderi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/322,794

(22) PCT Filed: Jul. 28, 2017

(86) PCT No.: PCT/JP2017/027382
§ 371 (c)(1),
(2) Date: Feb. 1, 2019

(87) PCT Pub. No.: WO2018/025759
PCT Pub. Date: Feb. 8, 2018

(65) Prior Publication Data
US 2019/0190422 A1    Jun. 20, 2019

(30) Foreign Application Priority Data
Aug. 1, 2016  (JP) ................................ 2016-151425

(51) Int. Cl.
*H02P 21/00* (2016.01)
*H02P 21/09* (2016.01)
(Continued)

(52) U.S. Cl.
CPC ................ *H02P 21/09* (2016.02); *B62D 5/04* (2013.01); *B62D 5/046* (2013.01); *B62D 5/049* (2013.01);
(Continued)

(58) Field of Classification Search
CPC ........... H02P 21/09; H02P 21/18; H02P 21/22
(Continued)

(56) References Cited

U.S. PATENT DOCUMENTS

| 7,007,769 B2 | 3/2006 | Hara et al. |
| 7,743,875 B2 | 6/2010 | Hidaka et al. |

(Continued)

FOREIGN PATENT DOCUMENTS

| CN | 101634252 A | 1/2010 |
| CN | 103248307 A | 8/2013 |
| JP | 2014-087213 A | 5/2014 |

OTHER PUBLICATIONS

Basler et al., "Fault-Tolerant Strategies for Electronic Power Steering Systems under Functional Safety Requirements", URL:https://www.researchgate.net/publication/271318741, retrieval date Jul. 31, 2016, 7 pages.

(Continued)

*Primary Examiner* — Erick D Glass
(74) *Attorney, Agent, or Firm* — Keating & Bennett

(57) ABSTRACT

A motor control method includes acquiring three current values of three-phase currents flowing through a motor, the three current values being detected by three current sensors, and two rotor angles of the motor, the two rotor angles being detected by two position sensors; performing six ways of calculation using two of the three current values and one of the two rotor angles; identifying at least one failed sensor from among the current sensors as well as the position sensors, using a table showing a relationship between a failed sensor and a pattern of a result of each of the six ways of calculation; selecting, as a normal sensor, a sensor different from the at least one failed sensor identified; and controlling the motor using the normal sensor selected.

12 Claims, 36 Drawing Sheets

(51) Int. Cl.
  *B62D 5/04* (2006.01)
  *B62D 6/00* (2006.01)
  *H02P 29/024* (2016.01)
  *H02P 21/18* (2016.01)
  *H02P 21/22* (2016.01)
  *H02P 21/36* (2016.01)
  *G07C 5/08* (2006.01)
  *H02P 27/12* (2006.01)

(52) U.S. Cl.
  CPC .............. *B62D 5/0484* (2013.01); *B62D 6/00* (2013.01); *G07C 5/0816* (2013.01); *H02P 21/18* (2016.02); *H02P 21/22* (2016.02); *H02P 21/36* (2016.02); *H02P 27/12* (2013.01); *H02P 29/0241* (2016.02)

(58) Field of Classification Search
  USPC ..................................................... 318/400.02
  See application file for complete search history.

(56) References Cited

U.S. PATENT DOCUMENTS

| | | | |
|---|---|---|---|
| 8,175,773 | B2 | 5/2012 | Nishimori |
| 8,983,727 | B2* | 3/2015 | Kifuku ................... H02P 29/02 |
| | | | 318/437 |
| 9,540,035 | B2 | 1/2017 | Kuramitsu |
| 2013/0077194 | A1* | 3/2013 | Hasan ..................... H02H 7/00 |
| | | | 361/31 |
| 2015/0188471 | A1* | 7/2015 | Kim ........................ H02P 21/22 |
| | | | 318/400.02 |
| 2017/0070178 | A1* | 3/2017 | Koseki ................... H02P 27/06 |

OTHER PUBLICATIONS

Lawson et al., "Fault Tolerant Control for an Electric Power Steering System", 17th IEEE International Conference no Control Applications Part of 2008 IEEE Multi-conference on Systems and Control, ThA02.3, Sep. 3-5, 2008, pp. 486-491.
Ji et al., "Reliability improvement of electric power steering system based on ISO 26262", 2013 International Conference on Quality, Reliability, Risk, Maintenance, and Safety Engineering, Jul. 15-18, 2013, 6 pages.
Berriri et al., "Easy and Fast Sensor Fault Detection and Isolation Algorithm for Electrical Drives", IEEE Transactions on Power Electronics, vol. 27, No. 2, Feb. 2012, pp. 490-499.
Bahri et al., "FPGA-Based FDI of Faulty Current Sensor in Current Controlled PWM Converters", Eurocon 2007 The International Conference on "Computer as a Tool", Sep. 9-12, 2007, pp. 1679-1686.
Rothenhagen et al., "Current Sensor Fault Detection, Isolation, and Reconfiguration for Doubly Fed Induction Generators", IEEE Transactions on Industrial Electronics, vol. 56, No. 10, Oct. 2009, pp. 1239-4245.
Akrad et aLl., "Design of a Fault-Tolerant Controller Based on Observers for a PMSM Drive", IEEE Transactions on Industrial Electronics, vol. 58, No. 4, Apr. 2011, pp. 1416-1427.
Foo et al., "A Sensor Fault Detection and Isolation Method in Interior Permanent-Magnet Synchronous Motor Drives Based on an Extended Kalman Filter", IEEE Transactions on Industrial Electronics, vol. 60, No. 8, Aug. 2013, pp. 3485-3495.
Official Communication issued in International Patent Application No. PCT/JP2017/027382, dated Oct. 10, 2017.

* cited by examiner

Table 1

| Used Sensor | No Fault | θ1 Fails | θ2 Fails | I2 Fails | I1 Fails | I3 Fails | I2, θ1 Fails | I2, θ2 Fails | I1, θ1 Fails | I1, θ2 Fails | I3, θ1 Fails | I3, θ2 Fails |
|---|---|---|---|---|---|---|---|---|---|---|---|---|
| I1,I2,θ1 (FD1) | ○ | × | ○ | × | × | ○ | × | × | × | × | × | × |
| I1,I2,θ2 (FD2) | ○ | ○ | × | × | × | ○ | × | × | × | × | ○ | × |
| I2,I3,θ1 (FD3) | ○ | × | ○ | × | ○ | × | × | × | × | ○ | × | × |
| I2,I3,θ2 (FD4) | ○ | ○ | × | × | ○ | × | × | × | ○ | × | × | × |
| I3,I1,θ1 (FD5) | ○ | × | ○ | ○ | × | × | × | ○ | × | × | × | × |
| I3,I1,θ2 (FD6) | ○ | ○ | × | ○ | × | × | ○ | × | × | × | × | × |

FIG.7

Table 2

| Used Sensor | No Fault / No Notification Signal | Select θ2 / Output Notification Signal | Select θ1 / Output Notification Signal | Select I1,I3 / Output Notification Signal | Select I2,I3 / Output Notification Signal | Select I1,I2 / Output Notification Signal | Select I3,I1, θ2 / Output Notification Signal | Select I3,I1, θ1 / Output Notification Signal | Select I2,I3, θ2 / Output Notification Signal | Select I2,I3, θ1 / Output Notification Signal | Select I1,I2, θ2 / Output Notification Signal | Select I1,I2, θ1 / Output Notification Signal |
|---|---|---|---|---|---|---|---|---|---|---|---|---|
| I1,I2,θ1 (FD1) | ○ | × | ○ | × | × | ○ | × | × | × | × | × | ○ |
| I1,I2,θ2 (FD2) | ○ | ○ | × | × | × | ○ | × | × | × | × | ○ | × |
| I2,I3,θ1 (FD3) | ○ | × | ○ | × | ○ | × | × | × | × | ○ | × | × |
| I2,I3,θ2 (FD4) | ○ | ○ | × | × | ○ | × | × | × | ○ | × | × | × |
| I3,I1,θ1 (FD5) | ○ | × | ○ | ○ | × | × | × | ○ | × | × | × | × |
| I3,I1,θ2 (FD6) | ○ | ○ | × | ○ | × | × | ○ | × | × | × | × | × |

FIG.8

Table 3

| Used Sensor | At Least I1 and I2 Fail | At Least I2 and I3 Fail | At Least I3 and I1 Fail | At Least θ1 and θ2 Fail | Other Cases |
|---|---|---|---|---|---|
| I1,I2,θ1 (FD1) | × | × | × | × | No Exist (Not Valid) |
| I1,I2,θ2 (FD2) | × | × | × | × | |
| I2,I3,θ1 (FD3) | × | × | × | × | |
| I2,I3,θ2 (FD4) | × | × | × | × | |
| I3,I1,θ1 (FD5) | × | × | × | × | |
| I3,I1,θ2 (FD6) | × | × | × | × | |

FIG.9

Table 4

| Used Sensor | No Sensor Selection Shutdown Output Notification Signal | No Sensor Selection Shutdown Output Notification Signal |
|---|---|---|
| I1,I2,θ1 | × | Other Cases |
| I1,I2,θ2 | × | |
| I2,I3,θ1 | × | |
| I2,I3,θ2 | × | |
| I3,I1,θ1 | × | |
| I3,I1,θ2 | × | |

FIG.10

Table 5

| Used Sensor | θ1 Fails Select θ2 Output Notification Signal | θ2 Fails Select θ1 Output Notification Signal | Shutdown Output Notification Signal |
|---|---|---|---|
| I1,I2,θ1 (FD1) | × | ○ | Other Cases |
| I1,I2,θ2 (FD2) | ○ | × | |
| I2,I3,θ1 (FD3) | × | ○ | |
| I2,I3,θ2 (FD4) | ○ | × | |
| I3,I1,θ1 (FD5) | × | ○ | |
| I3,I1,θ2 (FD6) | ○ | × | |

FIG.17

Table 6

| Used Sensor | I2 Fails Select I1,I3 Output Notification Signal | I1 Fails Select I2,I3 Output Notification Signal | I3 Fails Select I1,I2 Output Notification Signal | Shutdown Output Notification Signal |
|---|---|---|---|---|
| I1,I2,θ (FD1) | × | × | ○ | Other Cases |
| I1,I2,θ (FD2) | × | × | ○ | |
| I2,I3,θ (FD3) | × | ○ | × | |
| I2,I3,θ (FD4) | × | ○ | × | |
| I3,I1,θ (FD5) | ○ | × | × | |
| I3,I1,θ (FD6) | ○ | × | × | |

FIG.18

Table 7

| Used Sensor | I2,θ1 Fails Select I3,I1,θ2 Output Notification Signal | I2,θ2 Fails Select I3,I1,θ1 Output Notification Signal | I1,θ1 Fails Select I2,I3,θ2 Output Notification Signal | I1,θ2 Fails Select I2,I3,θ1 Output Notification Signal | I3,θ1 Fails Select I1,I2,θ2 Output Notification Signal | I3,θ2 Fails Select I1,I2,θ1 Output Notification Signal | Shutdown Output Notification Signal |
|---|---|---|---|---|---|---|---|
| I1,I2,θ1 (FD1) | × | × | × | × | × | ○ | Other Cases |
| I1,I2,θ2 (FD2) | × | × | × | × | ○ | × | |
| I2,I3,θ1 (FD3) | × | × | × | ○ | × | × | |
| I2,I3,θ2 (FD4) | × | ○ | ○ | × | × | × | |
| I3,I1,θ1 (FD5) | × | × | × | × | × | × | |
| I3,I1,θ2 (FD6) | ○ | × | × | × | × | × | |

FIG.19

MOTOR CONTROL METHOD, MOTOR DRIVE SYSTEM, AND ELECTRIC POWER STEERING SYSTEM

BACKGROUND OF THE INVENTION

1. Field of the Invention

The present disclosure relates to a motor control method for use in a motor drive system, a motor drive system, and an electric power steering system.

2. Description of the Related Art

Recently, an electric drive system has been widely used for various applications. A non-limiting example of the electric drive system is a motor drive system that controls an electric motor (hereinafter, referred to as a "motor") by vector control.

As described in, for example, Basler, Bruno, and Thomas Greiner. "Fault-Tolerant Strategies for Electronic Power Steering Systems under Functional Safety Requirements.", [online], [searched on Jul. 31, 2016], the Internet <URL: https://www.researchgate.net/publication/271318741>, a motor drive system is used in an electric power steering system for an automobile. In the electric power steering system, a motor generates power to assist the steering of the automobile by a driver. It has been required for the motor drive system in the electric power steering system to improve reliability.

Some current sensors and position sensors have been utilized in vector control for a motor. If any of the sensors fails, a motor drive system including the sensors can operate abnormally. It is hence considered to stop the motor upon detection of the fault of a sensor.

However, if the motor stops in the electric power steering system, a driver feels inconvenient since he or she operates an automobile without the assistance of the motor.

SUMMARY OF THE INVENTION

A motor control method according to an exemplary embodiment of the present disclosure includes (A) acquiring three current values Ia, Ib, and Ic of three-phase currents flowing through a motor, the three current values Ia, Ib, and Ic being detected by three current sensors, and two rotor angles θa and θb of the motor, the two rotor angles θa and θb being detected by two position sensors. The exemplary motor control method also includes (B) performing six ways of calculation using two of the three current values Ia, Ib, and Ic and one of the two rotor angles θa and θb. The exemplary motor control method also includes (C) identifying at least one failed sensor from among the current sensors as well as the position sensors, using a table showing a relationship between a failed sensor and a pattern of a result of each of the six ways of calculation. The exemplary motor control method also includes (D) selecting, as a normal sensor, a sensor different from the at least one failed sensor identified. The exemplary motor control method also includes (E) controlling the motor, using the normal sensor selected.

A motor control system according to an exemplary embodiment of the present disclosure includes a motor; three current sensors to respectively detect current values of three-phase currents flowing through the motor; two position sensors to respectively detect rotor angles of the motor; and a control circuit to control the motor. The control circuit acquires three current values Ia, Ib, and Ic of three-phase currents flowing through the motor, the three current values Ia, Ib, and Ic being detected by the three current sensors, and two rotor angles θa and θb of the motor, the two rotor angles θa and θb being detected by the two position sensors. The control circuit performs six ways of calculation using two of the three current values Ia, Ib, and Ic and one of the two rotor angles θa and θb. The control circuit identifies at least one failed sensor from among the current sensors as well as the position sensors, using a table showing a relationship between a failed sensor and a pattern of a result of each of the six ways of calculation. The control circuit selects, as a normal sensor, a sensor different from the at least one failed sensor identified. The control circuit controls the motor, using the normal sensor selected.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 7 is a table for identification of a failed sensor according to an exemplary embodiment of the present disclosure.

FIG. 8 is a table for selection of a normal sensor according to an exemplary embodiment of the present disclosure.

FIG. 9 is a table for identification of a failed sensor according to an exemplary embodiment of the present disclosure.

FIG. 10 is a table for selection of a normal sensor according to an exemplary embodiment of the present disclosure.

FIG. 17 is a table for identification of a failed sensor and selection of a normal sensor according to an exemplary embodiment of the present disclosure.

FIG. 18 is a table for identification of a failed sensor and selection of a normal sensor according to an exemplary embodiment of the present disclosure.

FIG. 19 is a table for identification of a failed sensor and selection of a normal sensor according to an exemplary embodiment of the present disclosure.

DETAILED DESCRIPTION OF THE PREFERRED EMBODIMENTS

With reference to the accompanying drawings, hereinafter, a specific description will be given of a motor control method, a motor drive system, and an electric power steering system according to an embodiment of the present disclosure. However, a specific description more than necessary will be occasionally omitted in order to avoid making the following description redundant more than necessary and to facilitate the understanding of a person skilled in the art. For example, a specific description on a well-known matter will be omitted occasionally. In addition, a repetitive description on substantially identical configurations will also be omitted occasionally. A motor drive system to be described later is mainly installed in an electric power steering system; however, a motor drive system according to an embodiment of the present disclosure is not limited thereto. A motor drive system according to an embodiment of the present disclosure is also applicable to any system in addition to an electric power steering system.

Figure 1:
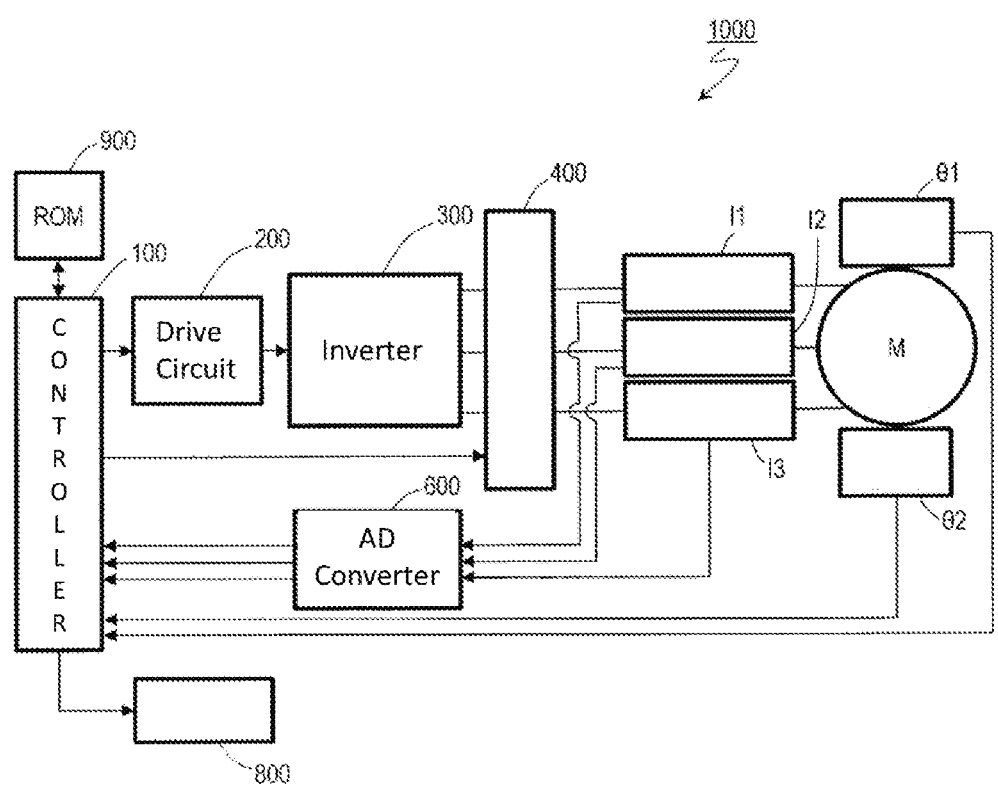
FIG. 1 is a schematic block diagram of a hardware configuration of a motor drive system according to an exemplary embodiment of the present disclosure.

FIG. 1 schematically illustrates hardware blocks of a motor drive system 1000 according to an embodiment.

The motor drive system 1000 typically includes a motor M, three current sensors I1, I2, and I3, two position sensors θ1 and θ2, a controller 100, a drive circuit 200, an inverter (also referred to as an "inverter circuit") 300, a shutdown circuit 400, an analog-to-digital conversion circuit (hereinafter, referred to as an "AD converter") 600, a notification device 800, and a read only memory (ROM) 900.

For example, the motor drive system 1000 may be designed in modules as a power pack, and may be manufactured and sold in the form of a motor module including a motor, a sensor, a driver, and a controller. It should be noted herein that the motor drive system 1000 will be described as an exemplary system including as its constituent the motor M. Alternatively, the motor drive system 1000 may be a system excluding as its constituent the motor M, the system being configured to drive the motor M.

Examples of the motor M may include a permanent magnet synchronous motor, such as a surface permanent magnet synchronous motor (SPMSM) or an interior permanent magnet synchronous motor (IPMSM), and a three-phase alternating-current motor. For example, the motor M includes three-phase (i.e., U phase, V phase, W phase) wires (not illustrated). The three-phase wires are electrically connected to the inverter 300.

The controller 100 is a control circuit that controls the overall operation of the motor drive system 1000. For example, the controller 100 is a micro control unit (MCU). Alternatively, the controller 100 may be a field programmable gate array (FPGA) in which a CPU core is incorporated.

For example, the controller 100 controls the torque and rotational speed of the motor M by vector control. The rotational speed (unit: rpm) is expressed by the number of revolutions of a rotor per unit time (e.g., one minute). The vector control is a method of decomposing a current flowing through a motor into a current component generating a torque and a current component generating a magnetic flux, and independently controlling the current components that are perpendicular to each other. For example, the controller 100 sets a target current value in accordance with actual current values measured by the three current sensors I1, I2, and I3, rotor angles measured by the two position sensors θ1 and θ2 (i.e., output signals from the two position sensors θ1 and θ2), and others. The controller 100 generates a pulse width modulation (PWM) signal, based on the target current value, and then outputs the PWM signal to the drive circuit 200.

When at least one of the three current sensors I1, I2, and I3 as well as the two position sensors θ1 and θ2 fails, the controller 100 detects occurrence of a sensor fault. The controller 100 then identifies the failed sensor. A method of detecting and identifying the failed sensor will be specifically described later. When the controller 100 identifies the failed sensor, then the controller 100 selects, as a normal sensor, a sensor different from the failed sensor. The controller 100 performs control to drive the motor, using the selected normal sensor. In addition, when the controller 100 identifies, as the failed sensor, at least one of the three current sensors I1, I2, and I3 as well as the two position sensors θ1 and θ2, then the controller 100 outputs a notification signal to the notification device 800. The operation of the notification device 800 will be specifically described later.

For example, the drive circuit 200 is a gate driver. The drive circuit 200 generates a control signal for controlling the switching operation of a switching element in the inverter 300, in accordance with a PWM signal to be output from the controller 100. It should be noted that the drive circuit 200 may be incorporated in the controller 100 as will be described later.

For example, the inverter 300 converts, into alternating-current power, direct-current power to be supplied from a direct-current power source (not illustrated) such as a battery, and then drives the motor M with the converted alternating-current power. For example, the inverter 300 converts direct-current power into three-phase alternating-current power of U-phase, V-phase, and W-phase pseudo sine waves, based on a control signal to be output from the drive circuit 200. The three-phase alternating-current power thus converted is used for driving the motor M.

For example, the shutdown circuit 400 includes a semiconductor switch element, such as a field-effect transistor (FET, typically a metal-oxide-semiconductor FET (MOSFET)) or an insulated gate bipolar transistor (IGBT), or a mechanical relay. The shutdown circuit 400 is electrically connected between the inverter 300 and the motor M. When the controller 100 detects failed sensors the number of which is equal to or more than a predetermined number, then the controller 100 outputs a shutdown signal for stopping the motor. The shutdown circuit 400 interrupts the electrical connection between the inverter 300 and the motor M, in accordance with the shutdown signal to be output from the controller 100. For example, the shutdown signal when being asserted turns off the semiconductor switch element of the shutdown circuit 400, and interrupts the electrical connection between the inverter 300 and the motor M. Thus, the shutdown circuit 400 stops power supply from the inverter 300 to the motor M.

The three current sensors I1, I2, and I3 respectively detect current values of three-phase currents flowing through the motor M. Specifically, the current sensor I1 detects a current value Ia of a current flowing through the U-phase wire. The current sensor I2 detects a current value Ib of a current flowing through the V-phase wire. The current sensor I3 detects a current value Ic of a current flowing through the W-phase wire. For example, each current sensor includes a shunt resistor, and a current detection circuit (not illustrated) that detects a current flowing through the shunt resistor. For example, the shunt resistor has a resistance value of about 0.1Ω.

The AD converter 600 converts by sampling, into digital signals, analog signals to be output from the three current sensors I1, I2, and I3, and then outputs the converted digital signals to the controller 100. Alternatively, the controller 100 may perform such AD conversion. In this situation, the three current sensors I1, I2, and I3 directly output analog signals to the controller 100.

The position sensors (also referred to as "angle sensors") θ1 and θ2 are disposed on the motor M, and each detect a rotor angle (rotor position) of the motor M, that is, a mechanical angle of the rotor. For example, the two position sensors θ1 and θ2 each include a resolver, a rotary encoder, or a Hall IC (including a Hall element). The two position sensors θ1 and θ2 respectively output the mechanical angles of the rotor to the controller 100. The controller 100 thus acquires the mechanical angles of the rotor.

For example, the motor drive system 1000 may include, as each of the two position sensors θ1 and θ2, a magnetic sensor including a magnetoresistive (MR) element, a speed sensor, or an acceleration sensor. In cases where a speed sensor is employed as each position sensor, the controller 100 subjects a rotational speed signal or an angular velocity signal to, for example, integration processing, thereby acquiring a position of the rotor, that is, an angle of rotation of the rotor. An angular velocity (unit: rad/s) is expressed by an angle of rotation of the rotor per second. In cases where an acceleration sensor is employed in place of each position sensor, the controller 100 calculates, from an angular acceleration signal, a position of the rotor, that is, an angle of rotation of the rotor. As used herein, the position sensor may include any sensor in addition to a sensor configured to acquire a rotor angle. Examples of the position sensor may include the magnetic sensor, the speed sensor, and the acceleration sensor each described above. In addition, the term "acquire" involves, for example, receiving a mechanical angle of a rotor from the outside, and acquiring a mechanical angle of a rotor in such a manner that the controller 100 calculates the mechanical angle.

For example, the notification device 800 includes a light emitting diode (LED). For example, when the controller 100 asserts a notification signal, the notification device 800 lights up or blinks in response to this assertion. For example, in cases where the motor drive system 1000 is installed in an automobile, the notification device 800 may be mounted on an instrument panel of a dashboard in addition to meters such as a speedometer and a tachometer. The notification device 800 allows a human to recognize the occurrence of a fault at the motor drive system. Alternatively, the notification device 800 may include a loudspeaker configured to give an alarm to a human by sound. Still alternatively, the notification device 800 may include a display device configured to give an alarm to a human in the form of at least one of an image and a character displayed thereon. Yet alternatively, the notification device 800 may appropriately combine the light, sound, and display with one another to give an alarm to a human.

Examples of the ROM 900 may include a programmable memory (e.g., a programmable read only memory (PROM)), a reprogrammable memory (e.g., a flash memory), and a read-only memory. The ROM 900 stores therein a control program including a group of commands that cause the controller 100 to control the motor M. For example, in booting the motor drive system 1000, the control program is once developed onto a random access memory (RAM) (not illustrated). It should be noted that the ROM 900 is not necessarily disposed outside the controller 100 as an external unit, but may be incorporated in the controller 100. For example, the controller 100, in which the ROM 900 is incorporated, may be the MCU described above.

Figure 2:
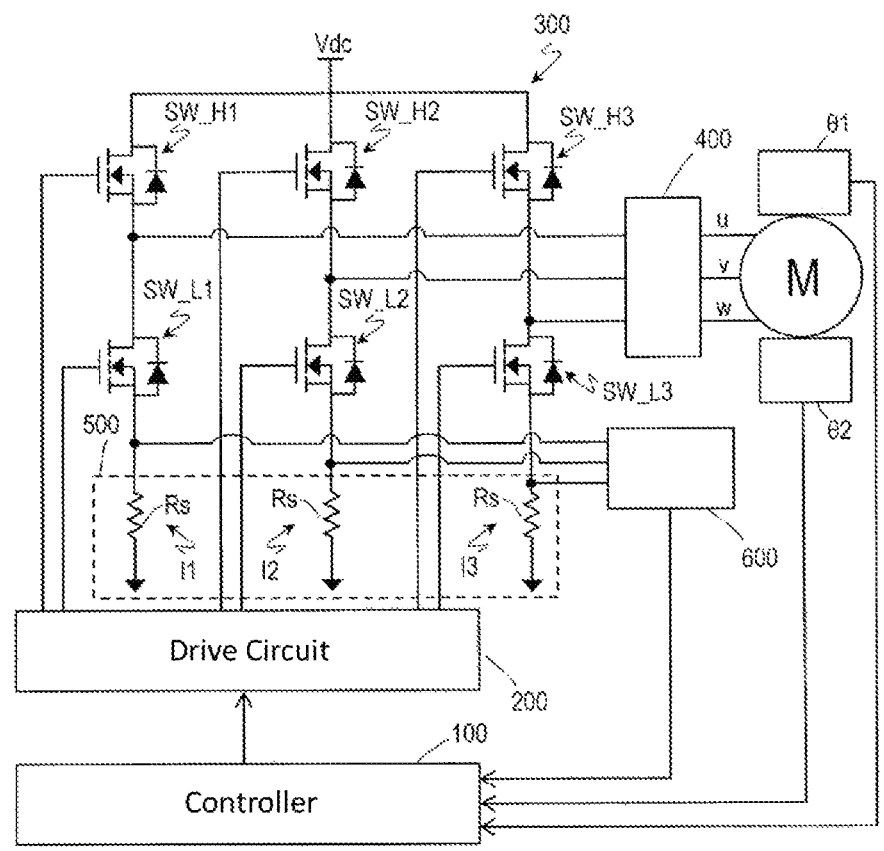
FIG. 2 is a schematic block diagram of a hardware configuration of an inverter in a motor drive system according to an exemplary embodiment of the present disclosure.

With reference to FIG. 2, a description will be given of an example of a hardware configuration of the inverter 300. FIG. schematically illustrates the hardware configuration of the inverter 300 according to the embodiment.

The inverter 300 includes three lower-arm switching elements and three upper-arm switching elements. In FIG. 2, switching elements SW_L1, SW_L2, and SW_L3 correspond to the lower-arm switching elements, and switching elements SW_H1, SW_H2, and SW_H3 correspond to the upper-arm switching elements. Examples of each switching element may include a FET and an IGBT. Each switching element includes a freewheeling diode that allows a flow of regenerative current toward the motor M.

The three current sensors I1, I2, and I3 may be disposed at any positions so long as to be capable of detecting current values of three-phase currents flowing through the motor M. In this example, each of the current sensors I1, I2, and I3 includes a shunt resistor Rs disposed in the inverter 300. The current sensors I1, I2, and I3 respectively detect currents flowing through the U-phase, V-phase, and W-phase wires. In this example, the currents are detected by a so-called three shunt method. As illustrated in FIG. 2, for example, the shunt resistors Rs may be electrically connected to the low-side side between low-side switching elements and the ground. Alternatively, for example, the shunt resistors Rs may be electrically connected to the high-side side between high-side switching elements and a power source.

For example, the controller 100 performs three-phase energization control using the vector control, thereby driving the motor M. For example, the controller 100 generates a PWM signal for the three-phase energization control, and outputs the PWM signal to the drive circuit 200. The drive circuit 200 generates, based on the PWM signal, a gate control signal for controlling the switching operation of each FET in the inverter 300, and then sends the gate control signal to the gate of each FET.

Figure 3:
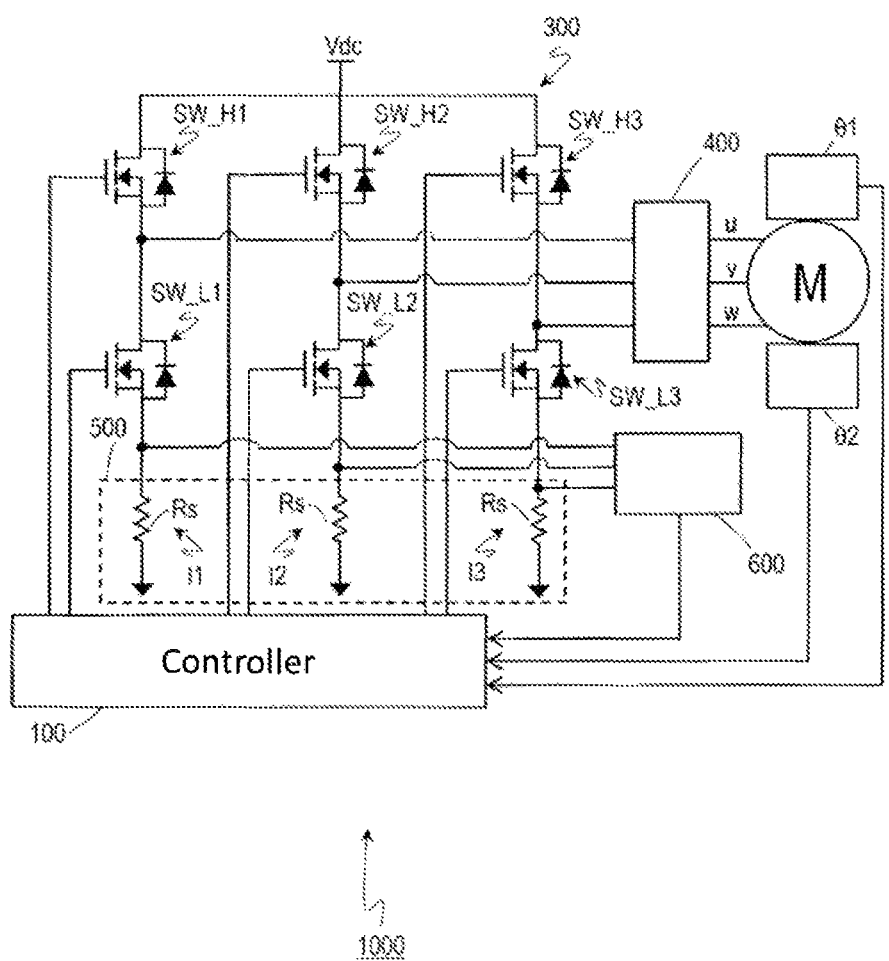
FIG. 3 is a schematic block diagram of a hardware configuration of a motor drive system according to a modification to an exemplary embodiment of the present disclosure.

FIG. 3 schematically illustrates hardware blocks of the motor drive system 1000 according to a modification of the embodiment. As illustrated in FIG. 3, the motor drive system 1000 does not necessarily include the drive circuit 200. In this situation, the controller 100 includes ports for directly controlling the switching operations of the respective FETs in the inverter 300. Specifically, the controller 100 generates a gate control signal based on a PWM signal. The controller 100 outputs the gate control signal through each port, thereby sending the gate control signal to the gate of each FET.

First, a description will be given of a sensor fault according to an embodiment of the present disclosure on the assumption that a position sensor fails. For example, a magnetic sensor is widely used as a position sensor in the motor drive system 1000 for an electric power steering (EPS) system in an automobile. In the embodiment, the magnetic sensor includes a MR element. For example, a sensor magnet is formed by injection molding on a shaft of a motor. For example, the magnetic sensor is mounted on a circuit board (not illustrated) for the motor. As the shaft rotates, the sensor magnet also rotates. Therefore, the magnetic sensor detects a change in magnetic flux caused by a change in position of the magnetic pole.

Typically, the sensor magnet is firmly fixed to the shaft. However, if a vehicle such as an automobile undergoes any strong impact from the outside (e.g., an impact to be caused when a vehicle runs up onto a curb), this impact is transmitted to the shaft, which may result in breakage or deformation of the sensor magnet. Alternatively, this impact may cause positional displacement of the sensor magnet. The breakage, deformation, or positional displacement makes the magnetic sensor difficult to accurately detect a position of a rotor. As used herein, the fault of the position sensor includes not only a fault of a position sensor, but also a breakage of a sensor magnet. In addition, the fault of the current sensor includes a breakage of a shunt resistor. When a sensor fault occurs at the motor drive system 1000, preferably, the motor is continuously driven without use of a failed sensor.

Next, a description will be given of an algorithm in detecting, identifying, and isolating a failed sensor according to the embodiment. The algorithm in identifying and isolating a failed sensor according to the embodiment may be implemented with only hardware such as an application specific integrated circuit (ASIC) or a FPGA, or may be implemented by a combination of hardware with software.

Figure 4:
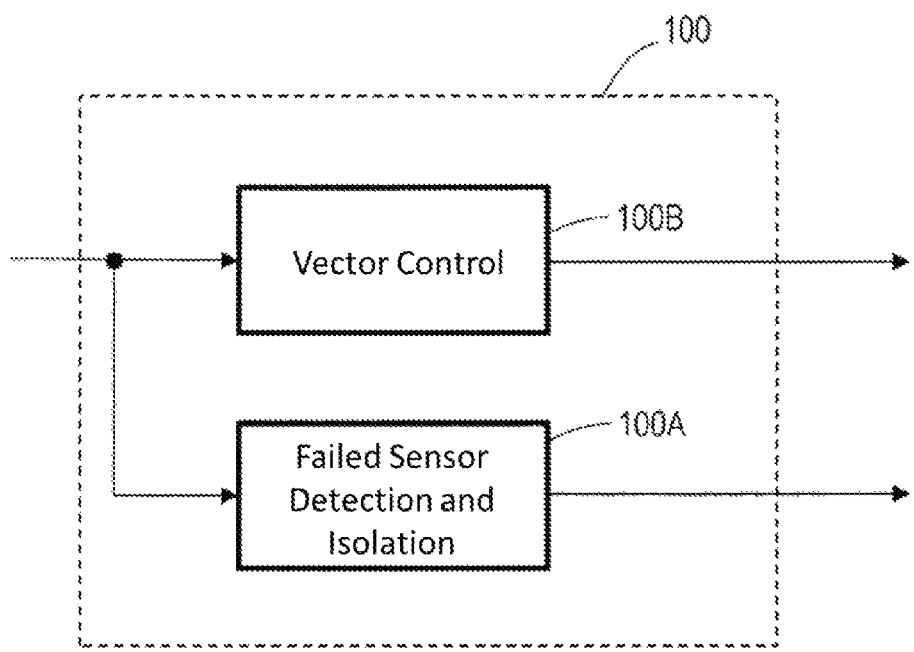
FIG. 4 is a schematic diagram of a functional block of a controller according to an exemplary embodiment of the present disclosure.

FIG. 4 schematically illustrates functional blocks of the controller 100. As used herein, each block is not illustrated on a hardware basis, but is illustrated on a functional block basis in the functional block diagram. For example, the software may be a module constituting a computer program for executing specific processing corresponding to each functional block.

For example, the controller 100 includes a failed-sensor detection and isolation unit 100A and a vector control unit 100B. As used herein, each functional block is referred to as a "unit" for convenience of the description. Naturally, the term "unit" is not used to limit and interpret each functional block to and as hardware or software. In the following description, the failed-sensor detection and isolation unit 100A will be simply referred to as a detection and isolation unit 100A as appropriate.

The current sensors I1, I2, and I3 respectively detect three current values Ia, Ib, and Ic of three-phase currents flowing through the motor M. The position sensor θ1 detects a rotor angle θa of the motor M, and the position sensor θ2 detects a rotor angle θb of the motor M. The detection and isolation unit 100A performs six ways of calculation using two of the three current values Ia, Ib, and Ic and one of the two rotor angles θa and θb. The detection and isolation unit 100A then identifies at least one failed sensor from among the current sensors I1, I2, and I3 as well as the position sensors θ1 and θ2, based on a result of the calculation. For example, the detection and isolation unit 100A identifies a failed sensor, using a table showing a relationship between failed sensors and results of six ways of calculation obtained in advance. The detection and isolation unit 100A then selects, as a normal sensor, a sensor different from the failed sensor, without selecting the failed sensor. This processing will be specifically described later. In the embodiment, the term "isolation" refers to "not select a failed sensor identified", that is, "not use a failed sensor identified".

The vector control unit 100B performs typical calculation required for vector control. It should be noted that the vector control is a known technique; therefore, the specific description thereof will not be given here.

Figure 5:
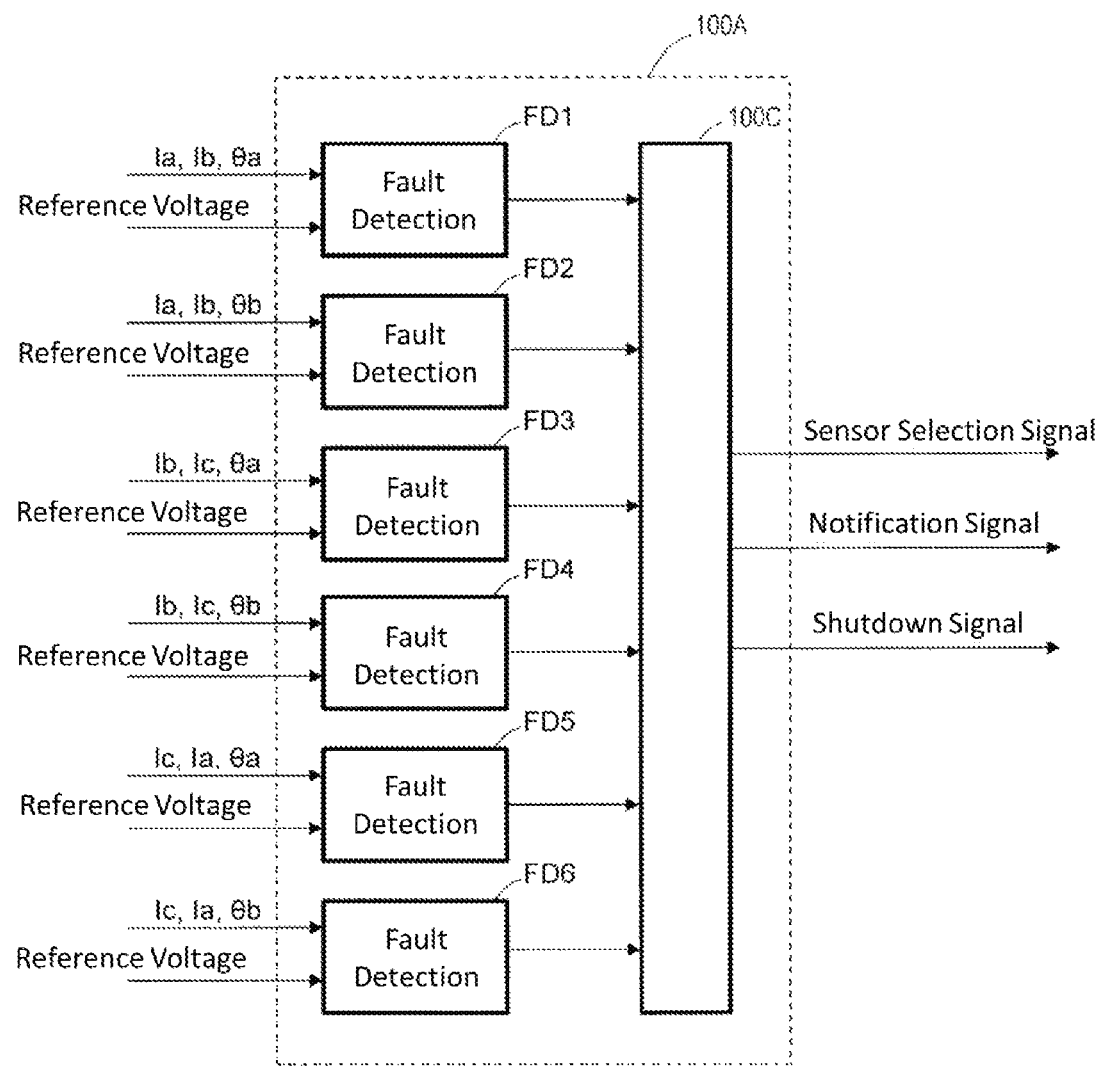
FIG. 5 is a schematic diagram of a functional block of a failed-sensor detection and isolation unit according to an exemplary embodiment of the present disclosure.

FIG. 5 schematically illustrates functional blocks of the detection and isolation unit 100A. The detection and isolation unit 100A includes six fault detection units FD1, FD2, FD3, FD4, FD5, and FD6, and a failed-sensor identification and isolation unit 100C. In the following description, the failed-sensor identification and isolation unit 100C will be simply referred to as an identification and isolation unit 100C as appropriate.

Each of the fault detection units FD1 to FD6 receives two of the three current values Ia, Ib, and Ic, one of the two rotor angles θa and θb, and a reference voltage. In this example, the fault detection unit FD1 receives the current values Ia and Ib, and the rotor angle θa. The fault detection unit FD2 receives the current values Ia and Ib, and the rotor angle θb. The fault detection unit FD3 receives the current values Ib and Ic, and the rotor angle θa. The fault detection unit FD4 receives the current values Ib and Ic, and the rotor angle θb. The fault detection unit FD5 receives the current values Ic and Ia, and the rotor angle θa. The fault detection unit FD6 receives the current values Ic and Ia, and the rotor angle θb.

Figure 6:
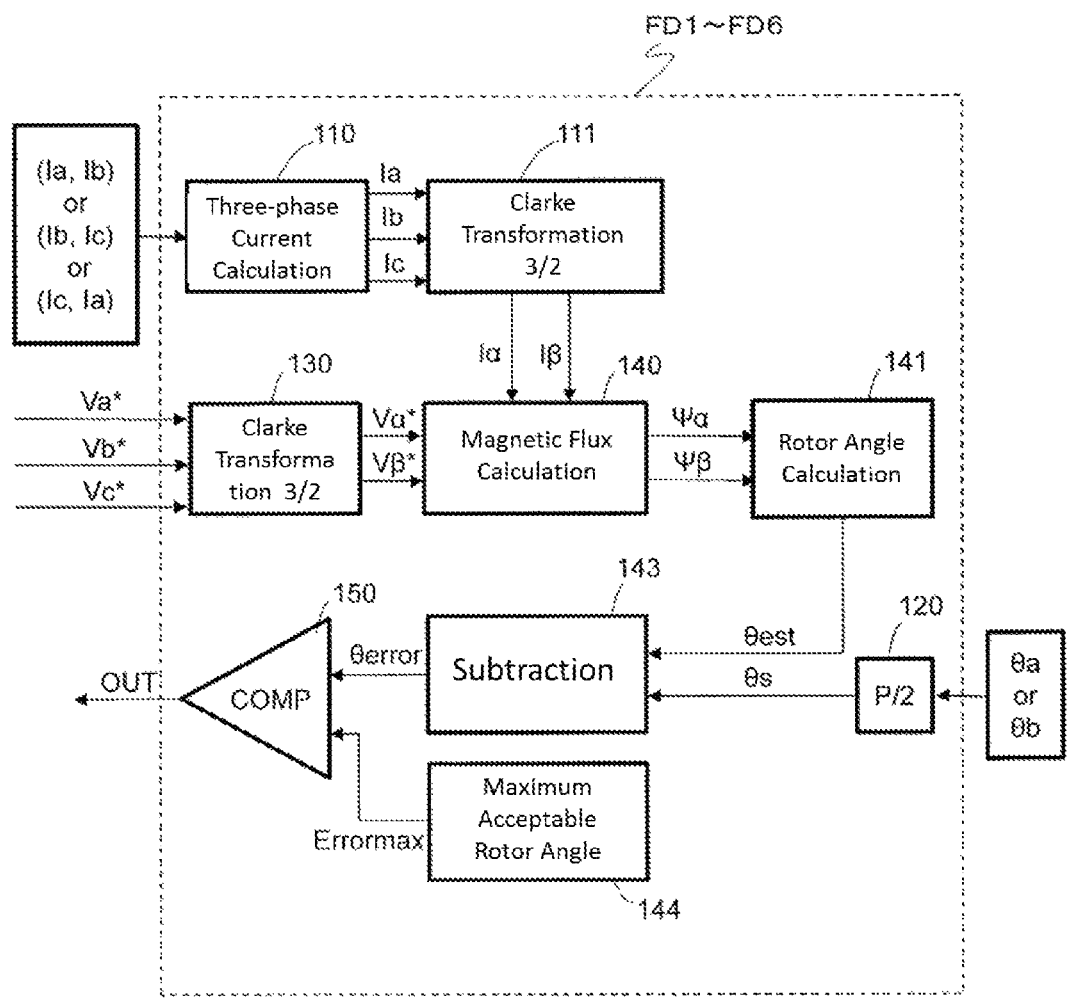
FIG. 6 is a schematic diagram of a functional block of a fault detection unit according to an exemplary embodiment of the present disclosure.

FIG. 6 schematically illustrates functional blocks of each of the fault detection units FD1 to FD6. The fault detection units FD1 to FD6 are equal to one another in a functional block structure, but are different from one another in a combination of a current value with a rotor angle to be received.

Each of the fault detection units FD1 to FD6 includes a three-phase current calculation unit 110, a Clarke transformation unit 111, an angle conversion unit 120, a Clarke transformation unit 130, a magnetic flux calculation unit 140, a rotor angle calculation unit 141, a subtraction unit 143, a maximum acceptable rotor angle unit 144, and a level comparison unit 150.

In cases where the respective functional blocks are mounted as software in the controller 100, the software may be executed by, for example, a core of the controller 100. As described above, the controller 100 may be implemented with a FPGA. In this situation, all of or some of the functional blocks may be implemented by hardware. In addition, when the processing is executed in a decentralization manner using a plurality of FPGAs, load of calculation on a specific computer is decentralized. In this situation, all of or some of the functional blocks illustrated in FIGS. 5 and 6 may be mounted in the plurality of FPGAs separately. The FPGAs are interconnected by, for example, an on-board control area network (CAN) to exchange data with one another.

The three-phase current calculation unit 110 receives two of the current values Ia, Ib, and Ic, and calculates a remaining one of the current values Ia, Ib, and Ic. According to the three-phase energization control, a sum of the current values of the three-phase currents is zero. In other words, a relation to be satisfied is that a sum of the current values Ia, Ib, and Ic is zero. With this relation, the three-phase current calculation unit 110 calculates, from the two current values, the remaining one current value. The three-phase current calculation unit 110 thus acquires the current values Ia, Ib, and Ic. The three-phase current calculation unit 110 outputs the current values Ia, Ib, and Ic to the Clarke transformation unit 111.

The Clarke transformation unit 111 transforms the current values Ia, Ib, and Ic output from the three-phase current calculation unit 110, into a current value Iα on the α axis and a current value Iβ on the β axis in an αβ fixed coordinate system, by so-called Clarke transformation for use in, for example, the vector control. The αβ fixed coordinate system is a stationary coordinate system. The α axis extends in a direction of one of three phases (e.g., a U-phase direction), and the β axis extends in a direction perpendicular to the α axis. The Clarke transformation unit 111 outputs the current values Iα and Iβ to the magnetic flux calculation unit 140.

As in the Clarke transformation unit 111, the Clarke transformation unit 130 transforms reference voltages Va*, Vb*, and Vc* into a reference voltage Vα* on the α axis and a reference voltage Vβ* on the β axis in the αβ fixed coordinate system, by the Clarke transformation. The reference voltages Va*, Vb*, and Vc* respectively represent the PWM signals for controlling the switching elements in the inverter 300. The Clarke transformation unit 130 outputs the reference voltages Vα* and Vβ* to the magnetic flux calculation unit 140.

The magnetic flux calculation unit 140 calculates magnetic fluxes Ψα and Ψβ in the αβ fixed coordinate system, using the current values Iα and Iβ as well as the reference voltages Vα* and Vβ*. For example, the magnetic fluxes Ψα and Ψβ are calculated in such a manner that a low-pass filter performs processing on $(V\alpha^* - RI\alpha)$ and $(V\beta^* - RI\beta)$ in Equation (1) and Equation (2). In Equations (1) and (2), LPF represents the processing by the low-pass filter.

$$\Psi\alpha = LPF(V\alpha^* - RI\alpha) \qquad \text{Equation (1)}$$

$$\Psi\beta = LPF(V\beta^* - RI\beta) \qquad \text{Equation (2)}$$

Also in Equations (1) and (2), R represents an armature resistance. For example, the armature resistance R is set for the magnetic flux calculation unit 140 by the core of the controller 100. A complex magnetic flux is expressed by Equation (3).

$$\Psi=(\Psi\alpha^2+\Psi\beta^2)^{1/2} \quad \text{Equation (3)}$$

The magnetic flux calculation unit 140 outputs the magnetic fluxes $\Psi\alpha$ and $\Psi\beta$ to the rotor angle calculation unit 141.

The rotor angle calculation unit 141 calculates an estimated electrical angle $\theta est$, using the magnetic fluxes $\Psi\alpha$ and $\Psi\beta$. For example, the estimated electrical angle $\theta est$ is calculated from Equation (4), Equation (5), and Equation (6).

$$\rho=\tan^{-1}(\Psi\beta/\Psi\alpha) \quad \text{Equation (4)}$$

$$\delta=\tan^{-1}(LqIq/\Psi) \quad \text{Equation (5)}$$

$$\theta est=\rho+\delta \quad \text{Equation (6)}$$

In Equation (5), Iq represents a current value on the q axis in a dq rotating coordinate system, and Lq represents an armature inductance on the q axis in the dq rotating coordinate system. In Equations (4) to (6), $\rho$ represents a phase angle, and $\delta$ represents a load angle. The rotor angle calculation unit 141 outputs the estimated electrical angle $\theta est$ to the subtraction unit 143.

The angle conversion unit 120 converts, into an electrical angle $\theta e$, one of mechanical angles $\theta a$ and $\theta b$ of the rotor respectively measured by the position sensors $\theta 1$ and $\theta 2$. For example, the electrical angle $\theta e$ is calculated from Equation (7).

$$\theta e=(P/2)\cdot\theta m \quad \text{Equation (7)}$$

In Equation (7), P represents the number of poles, and $\theta m$ represents the mechanical angle $\theta a$ or $\theta b$. The angle conversion unit 120 outputs the electrical angle $\theta e$ to the subtraction unit 143.

The subtraction unit 143 calculates an electrical angle $\theta error$ represented by an absolute value of a difference between the estimated electrical angle $\theta est$ and the electrical angle $\theta e$. The electrical angle $\theta error$ is expressed by Equation (8).

$$\theta error=|\theta est-\theta e| \quad \text{Equation (8)}$$

The subtraction unit 143 outputs the electrical angle $\theta error$ to the level comparison unit 150.

The maximum acceptable rotor angle unit 144 retains a maximum acceptable rotor angle Errormax having a predetermined value defined in advance, and outputs the maximum acceptable rotor angle to the level comparison unit 150. On condition that none of the sensors respectively detecting the current values and rotor angles for use in the calculations fails, the estimated electrical angle $\theta est$ calculated using the value of the current flowing through the motor M is ideally equal in value to the electrical angle $\theta e$ calculated using the mechanical angle measured. In other words, the electrical angle $\theta error$ ideally becomes zero. In practice, however, an error occurs to some extent. The electrical angle $\theta error$ can take a value larger than zero. In the embodiment, the maximum acceptable rotor angle Errormax is set at a given value in consideration of this error. For example, the maximum acceptable rotor angle Errormax may be set at, but not limited to, four degrees. On condition that none of the sensors respectively detecting the current values and rotor angles for use in the calculations fails, the electrical angle $\theta error$ takes a value less than the maximum acceptable rotor angle Errormax.

The level comparison unit 150 performs level comparison between the electrical angle $\theta error$ and the maximum acceptable rotor angle Errormax. The level comparison unit 150 outputs an error signal indicating a sensor fault on condition that the electrical angle $\theta error$ is equal to the maximum acceptable rotor angle Errormax or is larger than the maximum acceptable rotor angle Errormax.

On condition that at least one of the sensors respectively detecting the current values and rotor angles for use in the calculations fails, the estimated electrical angle $\theta est$ calculated using the value of the current flowing through the motor M is different in value from the electrical angle $\theta e$ calculated using the mechanical angle measured. In other words, the electrical angle $\theta error$ takes a value larger than zero. The level comparison unit 150 compares the electrical angle $\theta error$ with the maximum acceptable rotor angle Errormax having a predetermined value. When the electrical angle $\theta error$ is equal to or more than the predetermined value (e.g., four degrees), the level comparison unit 150 outputs the error signal. For example, the error signal is a digital signal. For example, an error signal level indicating a sensor fault may be allocated to "1", and an error signal level not indicating a sensor fault may be allocated to "0". In the example of allocation, the error signal is "0" in a normal situation, and is asserted to "1" upon occurrence of a sensor fault.

With reference to FIG. 5, the identification and isolation unit 100C identifies at least one failed sensor from among the current sensors I1, I2, and I3 as well as the position sensors $\theta 1$ and $\theta 2$, based on the results of the six ways of calculation performed by the six fault detection units FD1 to FD6. For example, the identification and isolation unit 100C identifies a failed sensor, using a table showing a relationship between failed sensors and reference patterns including the results of six ways of calculation obtained in advance.

FIG. 7 illustrates, as an example, a table 1 for identification of a failed sensor. The identification and isolation unit 100C detects the presence or absence of output of an error signal "1" from each of the six fault detection units FD1 to FD6. In the table 1, "X" represents a situation in which a fault detection unit outputs an error signal "1", and "O" represents a situation in which a fault detection unit outputs no error signal "1".

When all the current sensors I1, I2, and I3 as well as the position sensors $\theta 1$ and $\theta 2$ are normal, the fault detection units FD1 to FD6 each output "O". The identification and isolation unit 100C thus detects that no sensor fault occurs. As used herein, the reference patterns refer to patterns of (FD1) to (FD6) in the column direction of the table 1. On condition that a reference pattern "OOOOOO" applies, the identification and isolation unit 100C detects that no sensor fault occurs.

For example, when the fault detection units FD2, FD4, and FD6 each output "O", whereas the fault detection units FD1, FD3, and FD5 each output "X", the identification and isolation unit 100C identifies the position sensor $\theta 1$ as a failed sensor. In other words, on condition that a reference pattern "XOXOXO" applies, the identification and isolation unit 100C identifies the position sensor $\theta 1$ as a failed sensor.

For example, when the fault detection units FD3 and FD4 each output "O", whereas the fault detection units FD1, FD2, FD5, and FD6 each output "X", the identification and isolation unit 100C identifies the current sensor I1 as a failed sensor. For example, when the fault detection unit FD6 outputs "O", whereas the fault detection units FD1 to FD5 each output "X", the identification and isolation unit 100C identifies each of the current sensor I2 and the position sensor θ1 as a failed sensor.

As will be described with reference to FIG. 6, on condition that at least one of the sensors respectively detecting the current values and rotor angles for use in the calculations fails, each of the fault detection units FD1 to FD6 outputs an error signal "1" indicating an error. In other words, when there is a failed sensor, as to the six ways of calculation by the fault detection units FD1 to FD6, a result of calculation using a current value or rotor angle detected by a failed sensor is abnormal. As to the six ways of calculation by the fault detection units FD1 to FD6, a result of calculation using a current value and a rotor angle detected by a sensor different from the failed sensor is normal.

It is apparent from the table 1 that a value measured by a failed sensor is used for all the calculations of which the results are abnormal, from among the six ways of calculation by the fault detection units FD1 to FD6. For example, when the position sensor θ1 fails, each of the results of calculation by the fault detection units FD1, FD3, and FD5 using a value measured by the position sensor θ1 is abnormal, whereas each of the results of calculation by the fault detection units FD2, FD4, and FD6 not using the value measured by the position sensor θ1 is normal. In other words, the identification and isolation unit 100C identifies, as a failed sensor, a sensor that detects a measured value used for all the calculations of which the results are abnormal, from among the six ways of calculation.

Next, the identification and isolation unit 100C selects, as a normal sensor, a sensor different from the at least one failed sensor identified. FIG. 8 illustrates, as an example, a table 2 for selection of a normal sensor. Patterns of "O" and "X" in the table 2 are equal to those in the table 1.

When the identification and isolation unit 100C identifies one of the current sensors as a failed sensor, then the identification and isolation unit 100C selects, as a normal sensor, the current sensor different from the failed current sensor identified. For example, on condition that a reference pattern "XXOOXX" applies, the identification and isolation unit 100C identifies the current sensor I1 as a failed sensor. This situation concurrently indicates that the sensors other than the current sensor I1 are normal. In this situation, the identification and isolation unit 100C does not select the current sensor I1, but selects the remaining current sensors I2 and I3.

When the identification and isolation unit 100C identifies one of the position sensors as a failed sensor, then the identification and isolation unit 100C selects, as a normal sensor, the position sensor different from the failed position sensor identified. In other words, on condition that a reference pattern "OXOXOX" applies, the identification and isolation unit 100C identifies the position sensor θ2 as a failed sensor. This situation concurrently indicates that the sensors other than the position sensor θ2 are normal. In this situation, the identification and isolation unit 100C does not select the position sensor θ2, but selects the remaining position sensor θ1.

For example, on condition that a reference pattern "XXXXXO" applies, the identification and isolation unit 100C identifies each of the current sensor I2 and the position sensor θ1 as a failed sensor. This situation concurrently indicates that the sensors other than the current sensor I2 and the position sensor θ1 are normal. In this situation, the identification and isolation unit 100C does not select the current sensor I2 and the position sensor θ1, but selects the remaining current sensors I1 and I3 as well as the remaining position sensor θ2.

In driving the motor by the three-phase energization control using the vector control, the use of two current sensors and one position sensor enables normal control of the motor. Therefore, the use of a current sensor and a position sensor each selected enables sustained control to drive the motor.

The identification and isolation unit 100C generates a sensor selection signal indicating a sensor to be selected, and then outputs the sensor selection signal to the vector control unit 100B (FIG. 4). Based on the sensor selection signal, the vector control unit 100B does not select an output signal from a failed sensor, but selects an output signal from a sensor different from the failed sensor. The vector control unit 100B causes the drive circuit 200 to drive the motor M, using the output signal from the selected sensor.

When the identification and isolation unit 100C identifies at least one of a current sensor and a position sensor as a failed sensor, then the identification and isolation unit 100C generates a notification signal for calling attention to a human. The identification and isolation unit 100C outputs a notification signal to the notification device 800 (FIG. 1). For example, the notification device 800 calls attention to a human, using at least one of light, sound, and display, as described above. The notification device 800 thus allows a human to recognize the occurrence of a fault at the motor drive system, more specifically, the occurrence of a sensor fault.

According to the embodiment, even in the occurrence of a sensor fault, the use of remaining normal sensors enables sustained control to drive the motor M. However, it is preferable that the failed sensor be replaced with a normal sensor without being left as it is. The operation of the notification device 800 allows a human to recognize the necessity of replacement of a sensor.

Next, a description will be given of an operation to stop the motor M when the identification and isolation unit 100C detects failed sensors the number of which is equal to or more than a predetermined number.

In the example described above, even in the occurrence of a sensor fault, the remaining normal sensors are used for sustaining the control to drive the motor M. According to an embodiment of the present disclosure, however, if two of the three current sensors fail or if all the two position sensors fail, the motor M stops.

FIG. 9 illustrates, as an example, a table 3 for identification of a failed sensor. FIG. 10 illustrates, as an example, a table 4 for selection of a normal sensor. When two of the current sensors I1, I2, and I3 fail or when both the position sensors θ1 and θ2 fail, the fault detection units FD1 to FD6 each output "X". According to an embodiment of the present disclosure, in this situation, the motor M stops without selection of a sensor. The identification and isolation unit 100C generates a shutdown signal, and then outputs the shutdown signal to the shutdown circuit 400 (FIG. 1). Based on the shutdown signal, the shutdown circuit 400 interrupts the electrical connection between the inverter 300 and the motor M. Thus, the shutdown circuit 400 stops power supply from the inverter 300 to the motor M. At the same time, the identification and isolation unit 100C generates a notification signal for calling attention to a human. The identification and isolation unit 100C outputs a notification signal to the notification device 800 (FIG. 1). For example, the notification device 800 calls attention to a human, using at least one of light, sound, and display, as described above.

The notification device 800 thus allows a human to recognize the occurrence of a fault at the motor drive system, more specifically, the stop of the motor M. The electric power steering system allows a driver of an automobile to recognize that the motor stops to cease steering assistance. For example, the driver pulls the automobile to the shoulder of a road, in accordance with attention given by the notification device 800.

In the foregoing embodiment, the detection and isolation unit 100A always performs an arithmetic operation while the motor M is driven. Alternatively, the controller 100 may include an arithmetic unit configured to detect a sensor fault, and the detection and isolation unit 100A may start to perform an arithmetic operation upon detection of a sensor fault.

Figure 11:
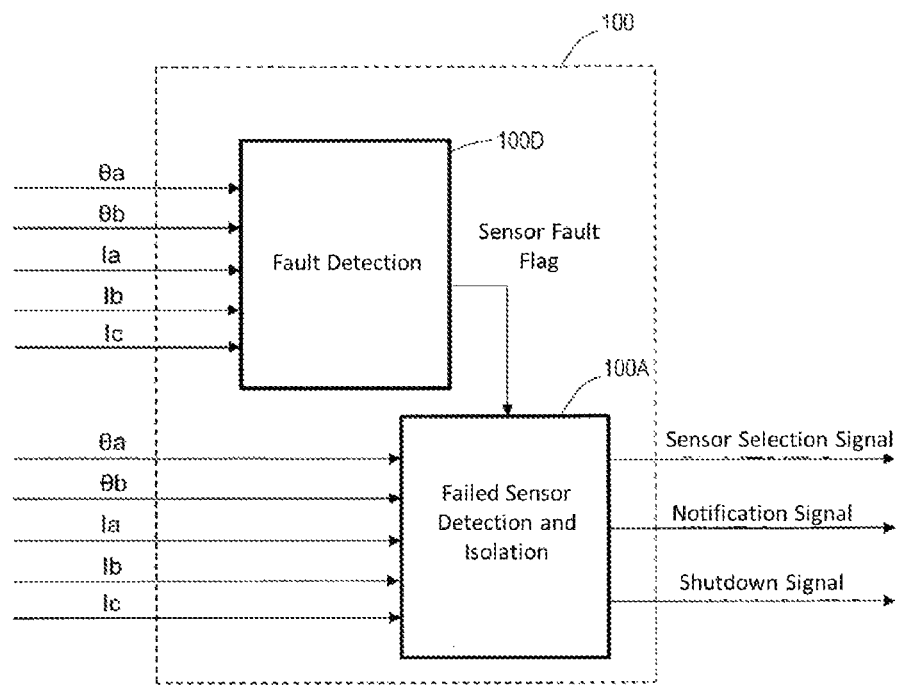
FIG. 11 is a schematic diagram of a functional block of a controller according to a modification of an exemplary embodiment of the present disclosure.
Figure 12:
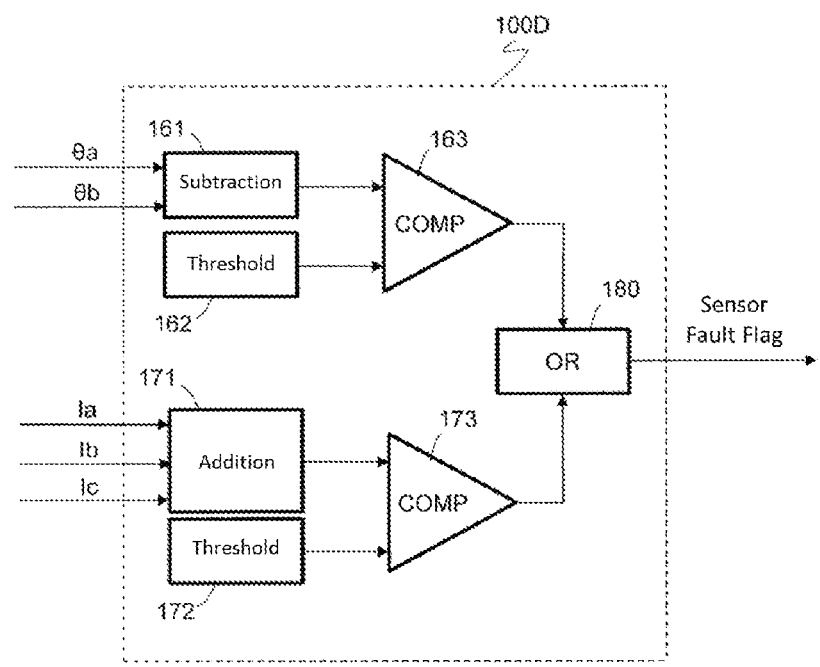
FIG. 12 is a schematic diagram of a functional block of a fault detection unit according to an exemplary embodiment of the present disclosure.
Figure 13:
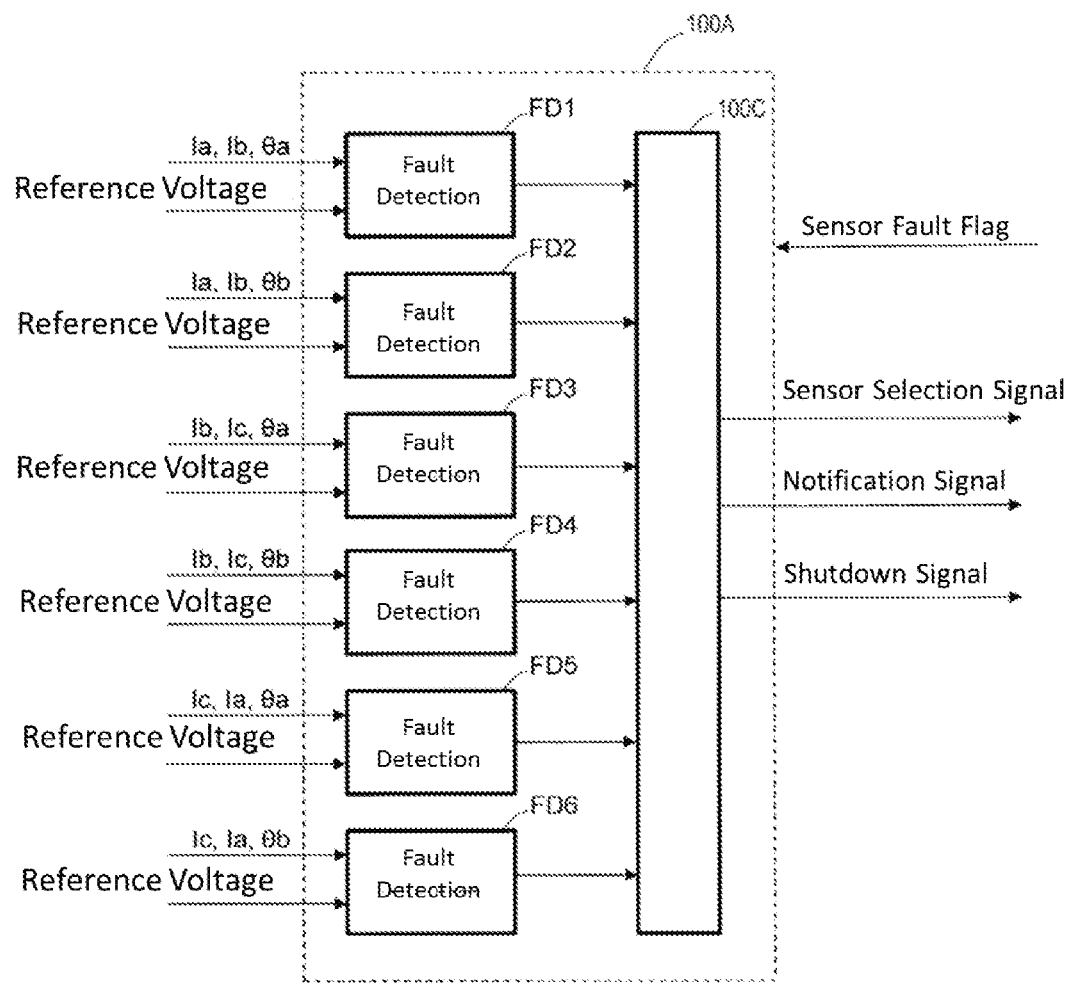
FIG. 13 is a schematic diagram of a functional block of a failed-sensor detection and isolation unit according to an exemplary embodiment of the present disclosure.

FIG. 11 schematically illustrates functional blocks of the controller 100 according to a modification of the embodiment. In the example illustrated in FIG. 11, the controller 100 includes a fault detection unit 100D. For ease of the description, FIG. 11 does not illustrate the vector control unit 100B (FIG. 4); however, the controller 100 includes the vector control unit 100B. FIG. 12 schematically illustrates functional blocks of the fault detection unit 100D. FIG. 13 schematically illustrates functional blocks of the detection and isolation unit 100A.

With reference to FIG. 12, the fault detection unit 100D includes a subtraction unit 161, a threshold unit 162, a level comparison unit 163, an addition unit 171, a threshold unit 172, a level comparison unit 173, and an OR unit 180.

The subtraction unit 161 calculates an absolute value of a difference between a rotor angle $\theta a$ detected by the position sensor $\theta 1$ and a rotor angle $\theta b$ detected by the position sensor $\theta 2$. When both the two position sensors $\theta 1$ and $\theta 2$ are normal, the rotor angles $\theta a$ and $\theta b$ are substantially equal in value to each other. Therefore, the absolute value of the difference between the rotor angle $\theta a$ and the rotor angle $\theta b$ is substantially zero. When at least one of the two position sensors $\theta 1$ and $\theta 2$ fails, the rotor angles $\theta a$ and $\theta b$ are different in value from each other. Therefore, the absolute value of the difference between the rotor angle $\theta a$ and the rotor angle $\theta b$ is a value different from zero. The subtraction unit 161 outputs, to the level comparison unit 163, the absolute value of the difference between the rotor angle $\theta a$ and the rotor angle $\theta b$. The threshold unit 162 retains a threshold set in advance, and outputs the threshold to the level comparison unit 163. The threshold retained in the threshold unit 162 is set at a given value. For example, the threshold is, but not limited to, four degrees.

The level comparison unit 163 compares the threshold with the absolute value of the difference between the rotor angle $\theta a$ and the rotor angle $\theta b$. On condition that the absolute value is equal to or more than the threshold, the level comparison unit 163 outputs an error signal indicating a sensor fault to the OR unit 180. On condition that the absolute value is less than the threshold, the level comparison unit 163 outputs no error signal.

The addition unit 171 calculates a sum of the current values Ia, Ib, and Ic detected by the three current sensors I1, I2, and I3. When all the three current sensors I1, I2, and I3 are normal, the sum of the current values detected by the three current sensors is substantially zero. In contrast to this, when at least one of the three current sensors I1, I2, and I3 fails, the sum of the current values detected by the three current sensors takes a value different from zero. The addition unit 171 outputs, to the level comparison unit 173, the arithmetic result of the sum of the current values Ia, Ib, and Ic. The threshold unit 172 retains a threshold set in advance, and outputs the threshold to the level comparison unit 173. The threshold retained in the threshold unit 172 is set at a given value.

The level comparison unit 173 compares the threshold with the value of the sum of the current values. On condition that the value of the sum is equal to or more than the threshold, the level comparison unit 173 outputs an error signal indicating a sensor fault to the OR unit 180. On condition that the value of the sum is less than the threshold, the level comparison unit 173 outputs no error signal.

When the OR unit 180 receives an error signal from at least one of the level comparison units 163 and 173, then the OR unit 180 outputs a sensor fault flag to the detection and isolation unit 100A. When the detection and isolation unit 100A receives the sensor fault flag, then the detection and isolation unit 100A executes processing of detecting, identifying, and isolating a failed sensor. The details of the processing executed by the detection and isolation unit 100A have been described above. As described above, when the fault detection unit 100D detects occurrence of a sensor fault, the detection and isolation unit 100A starts to perform an arithmetic operation. This configuration enables a reduction in power consumption by the controller 100.

Figure 14:
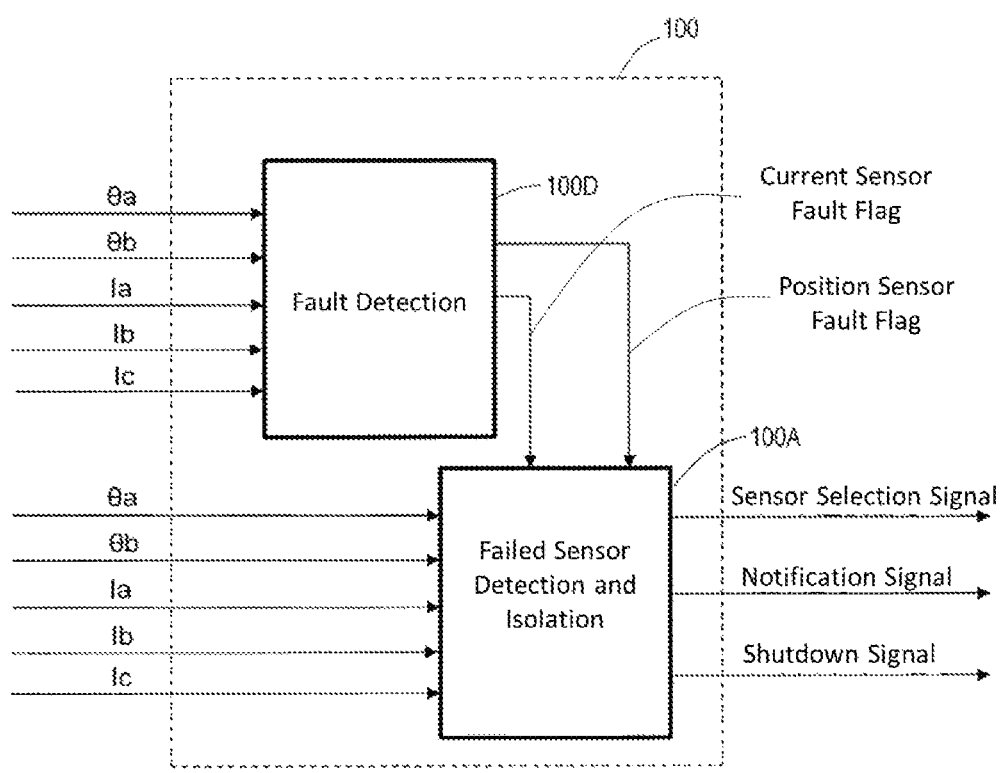
FIG. 14 is a schematic diagram of a functional block of a controller according to an exemplary embodiment of the present disclosure.
Figure 15:
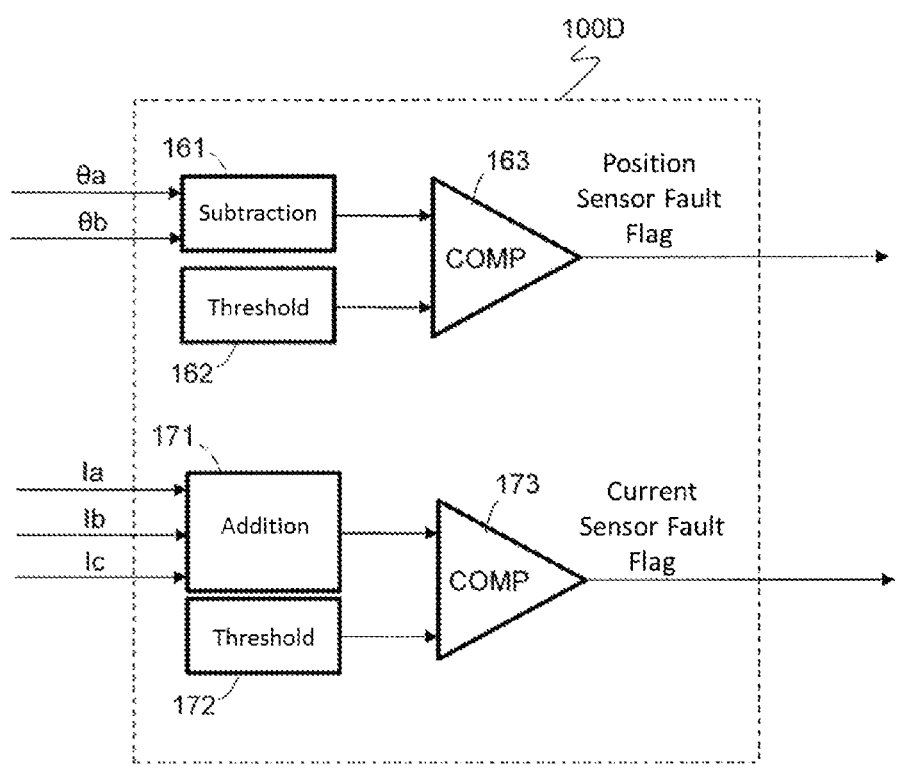
FIG. 15 is a schematic diagram of a functional block of a fault detection unit according to an exemplary embodiment of the present disclosure.
Figure 16:
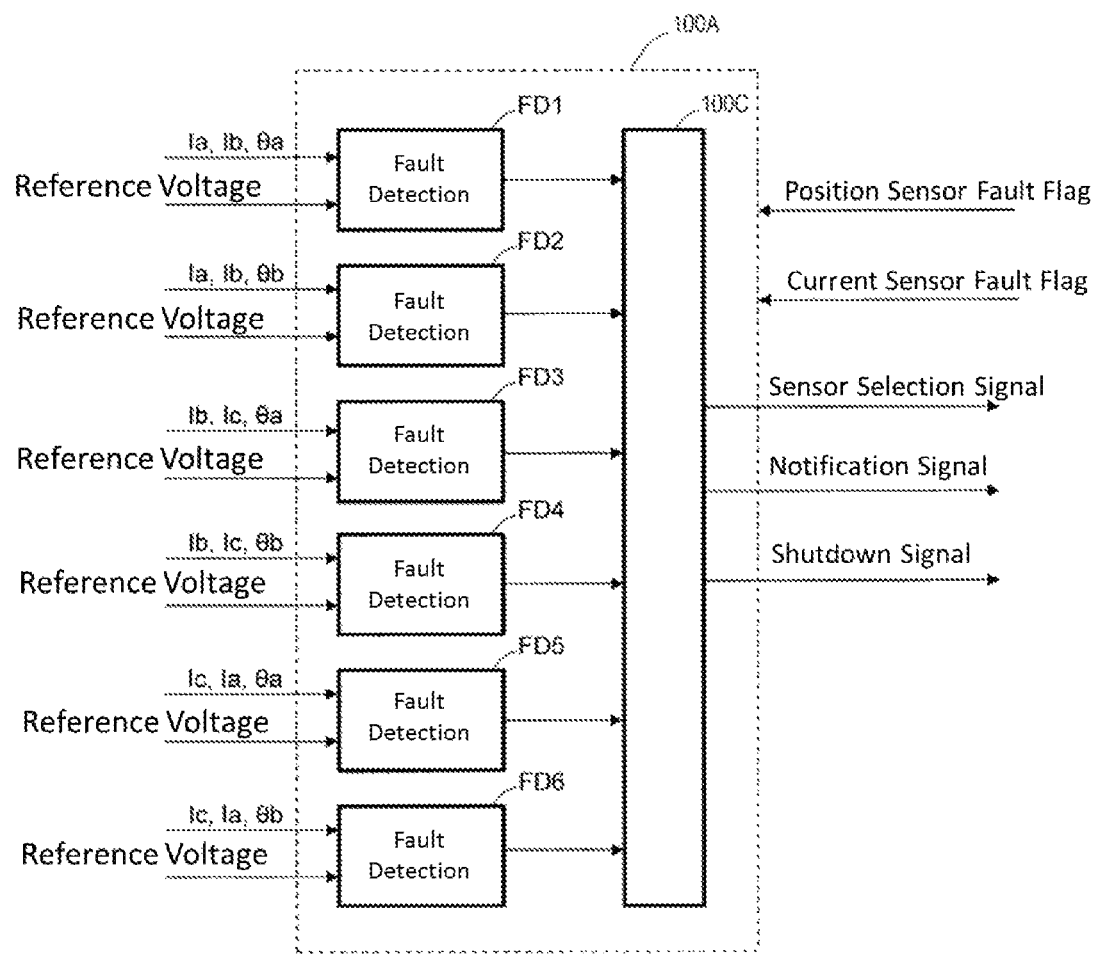
FIG. 16 is a schematic diagram of a functional block of a failed-sensor detection and isolation unit according to an exemplary embodiment of the present disclosure.

The fault detection unit 100D does not necessarily include the OR unit 180. FIG. 14 schematically illustrates functional blocks of the controller 100. For ease of the description, FIG. 11 does not illustrate the vector control unit 100B (FIG. 4); however, the controller 100 includes the vector control unit 100B. FIG. 15 schematically illustrates functional blocks of the fault detection unit 100D. FIG. 16 schematically illustrates functional blocks of the detection and isolation unit 100A.

In the example illustrated in FIG. 15, the level comparison unit 163 compares the threshold with the absolute value of the difference between the rotor angle $\theta a$ and the rotor angle $\theta b$. On condition that the absolute value is equal to or more than the threshold, the level comparison unit 163 outputs the position sensor fault flag to the detection and isolation unit 100A. On condition that the absolute value is less than the threshold, the level comparison unit 163 outputs no position sensor fault flag. The level comparison unit 173 compares the threshold with the value of the sum of the current values. On condition that the value of the sum is equal to or more than the threshold, the level comparison unit 173 outputs the current sensor fault flag to the detection and isolation unit 100A. On condition that the value of the sum is less than the threshold, the level comparison unit 173 outputs no current sensor fault flag.

When the detection and isolation unit 100A receives at least one of the position sensor fault flag and the current sensor fault flag, then the detection and isolation unit 100A executes processing of detecting, identifying, and isolating a failed sensor. The details of the processing executed by the detection and isolation unit 100A have been described above. In this example, the detection and isolation unit 100A may include the OR unit 180 (FIG. 12). As described above, when the fault detection unit 100D detects occurrence of a sensor fault, the detection and isolation unit 100A starts to perform an arithmetic operation. This configuration enables a reduction in power consumption by the controller 100.

Also in this example, the arithmetic operation by the fault detection unit 100D enables identification as to which one of a current sensor and a position sensor fails. Therefore, a table for use in the detection and isolation unit 100A may be limited to one of the fault of a current sensor and the fault of a position sensor.

For example, when the detection and isolation unit 100A receives the position sensor fault flag, then the detection and isolation unit 100A identifies and isolates a failed position sensor, using a table 5 of FIG. 17. When the detection and isolation unit 100A receives the current sensor fault flag, then the detection and isolation unit 100A identifies and isolates a failed current sensor, using a table 6 of FIG. 18. When the detection and isolation unit 100A receives both the position sensor fault flag and the current sensor fault flag, then the detection and isolation unit 100A identifies and isolates a failed position sensor and a failed current sensor, using a table 7 of FIG. 19. The use of a table limited to a specific sensor fault enables a reduction in load of an arithmetic operation on the controller 100.

Next, a description will be given of an electric power steering (EPS) system. Typically, a vehicle such as an automobile is equipped with an EPS system. The EPS system generates an assist torque that assists a steering torque in a steering system, the steering torque being generated when a driver turns a steering wheel. The assist torque is generated by an assist torque mechanism. The assist torque reduces a burden of a steering operation on the driver. For example, the assist torque mechanism includes a steering torque sensor, an automotive electronical control unit (ECU), a motor, a speed reduction mechanism, and the like. The steering torque sensor detects a steering torque in the steering system. The ECU generates a drive signal based on a detection signal from the steering torque sensor. The motor generates an assist torque responsive to the steering torque, based on the drive signal. The motor transmits the assist torque to the steering system via the speed reduction mechanism.

The ECU includes a controller, a power source, an input/output circuit, an AD converter, a load drive circuit, a ROM, and the like. For example, the controller is a circuit corresponding to the controller 100 described above, and the load drive circuit is a circuit corresponding to the drive circuit 200 described above. In the automobile, the ECU serves as a core to constitute an electronic control system.

Figure 20:
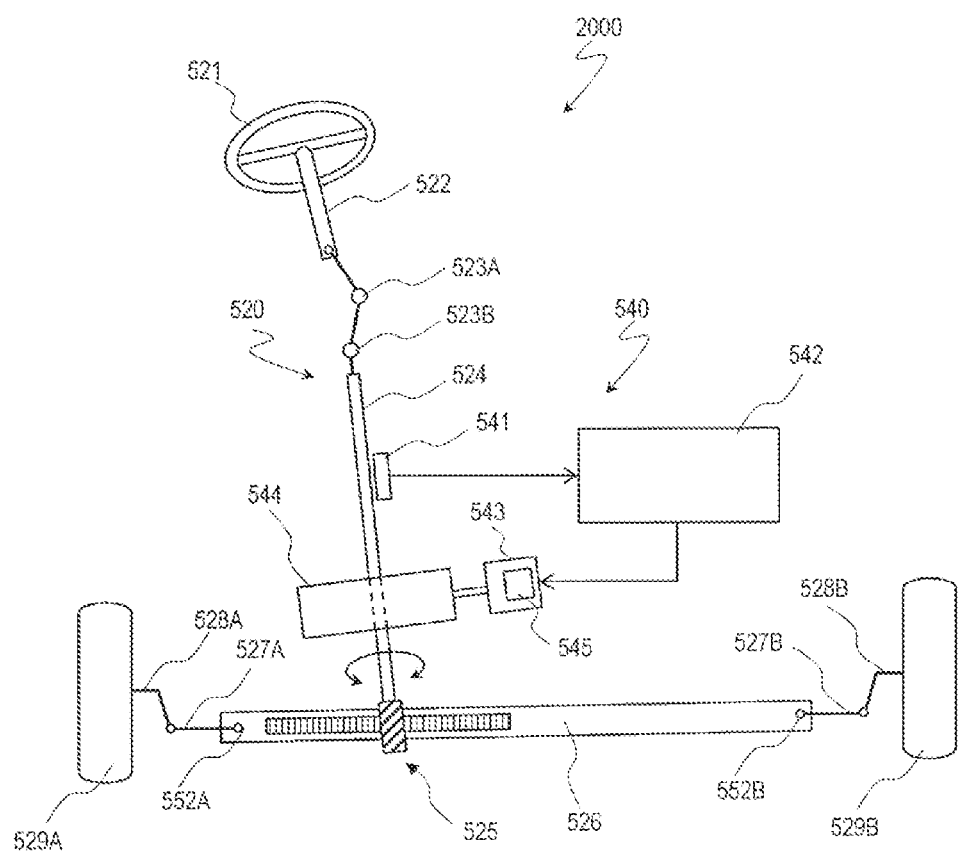
FIG. 20 is a schematic block diagram of a configuration of an EPS system according to an exemplary embodiment of the present disclosure.

FIG. 20 schematically illustrates a typical configuration of an EPS system 2000 according to the embodiment.

Typically, a vehicle such as an automobile is equipped with an EPS system. The EPS system 2000 according to the embodiment includes a steering system 520, and an assist torque mechanism 540 that generates an assist torque. The EPS system 2000 generates an assist torque that assists a steering torque in a steering system, the steering torque being generated when a driver turns a steering wheel. The assist torque reduces a burden of a steering operation on the driver.

For example, the steering system 520 includes a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, left and right wheels 529A and 529B, and the like.

For example, the assist torque mechanism 540 includes a steering torque sensor 541, an automotive ECU 542, a motor 543, a speed reduction mechanism 544, and the like. The steering torque sensor 541 detects a steering torque in the steering system 520. The ECU 542 generates a drive signal based on a detection signal from the steering torque sensor 541. The motor 543 generates an assist torque responsive to the steering torque, based on the drive signal. The motor 543 transmits the assist torque to the steering system 520 via the speed reduction mechanism 544.

For example, the ECU 542 includes the controller 100 described above, the drive circuit 200 described above, and the like. In the automobile, the ECU serves as a core to constitute an electronic control system. In the EPS system 2000, for example, the ECU 542, the motor 543, and an inverter 545 constitute a motor drive system. The motor drive system 1000 may be suitably used as the motor drive system.

The following description concerns a result of verification using Matlab/Simulink available from MathWorks as to the validity of the algorithm in detecting, identifying, and isolating a failed sensor according to the embodiment. This verification was made using a model of a surface permanent magnet (SPM) motor. Table 1 shows values of various system parameters in the verification. In this verification model, the SPM motor is controlled by vector control. Table 2 shows variables for use in the vector control.

TABLE 1

| | |
|---|---|
| Moment of inertia | $6.9e^{-5}$ [kg · m$^2$] |
| Coefficient of friction | $5.1e^{-3}$ [Nm/(rad/s)] |
| Resistance (motor + ECU) | 8.50 mΩ + 5.43 mΩ |
| $L_d$ (nominal) | 40.7 µH |
| $L_q$ (nominal) | 38.8 µH |
| Voltage range | 10 to 16 V |
| Temperature range | −40° C. to 90° C. |
| Motor type | DC Brushless motor |
| Number of poles | 8 |
| Number of slots | 12 |
| Maximum current | 77 A |
| Rated voltage | 13.5 V |
| Rated temperature | 80° C. |
| Maximum torque | 5.96 N · m |
| Wire diameter | φ1.45 mm |
| Number of turns | 11.5 |

TABLE 2

| | |
|---|---|
| Reference Iq | 10.32 A/20.65 A |
| Reference Id | 0 A |
| Speed | 750 rpm |

With reference to FIGS. 21 to 26, a description will be given of a result of simulation on condition that one of the three current sensors I1, I2, and I3 fails. In the following description, a case where such a sensor fault occurs is referred to as a "first case".

Figure 21:
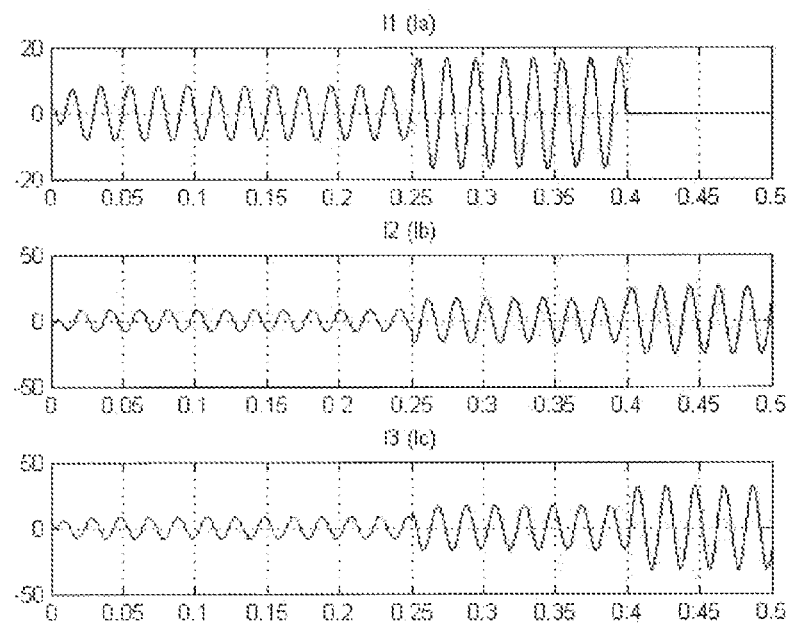
FIG. 21 is a waveform chart of currents detected by three current sensors according to a first case.

FIG. 21 illustrates waveforms of currents detected by the three current sensors I1, I2, and I3 according to the first case. In FIG. 21, the vertical axis represents the currents (A), and the horizontal axis represents a time (s). As to simulated waveforms illustrated in FIGS. 21 to 56, the horizontal axis represents a time (s). FIGS. 21 to 56 each illustrate a waveform in a period of time from 0 seconds to 0.5 seconds.

Figure 22:
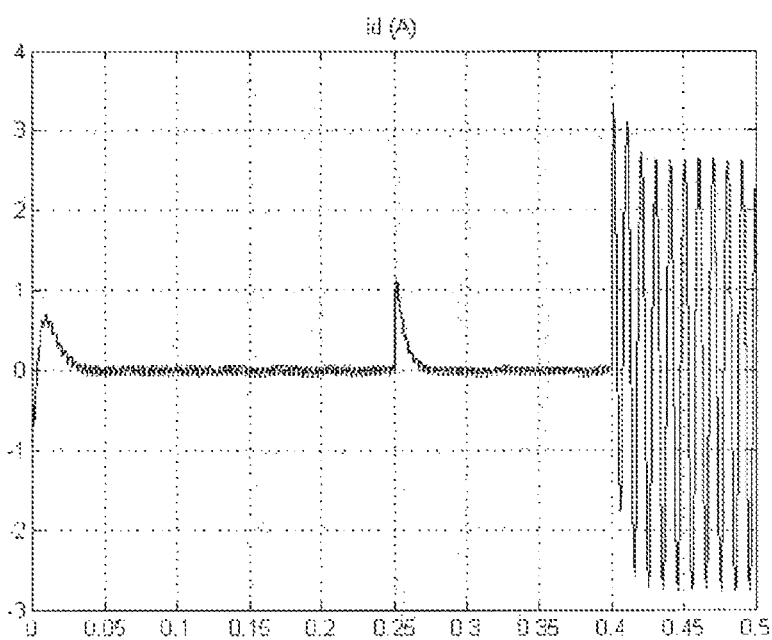
FIG. 22 is a waveform chart of a current Id according to the first case.
Figure 23:
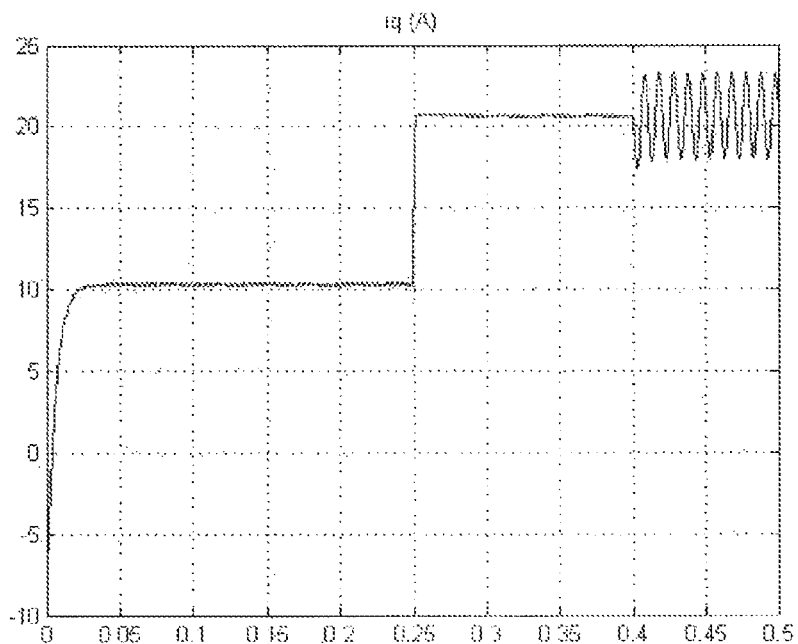
FIG. 23 is a waveform chart of a current Iq according to the first case.

FIG. 22 illustrates a waveform of a current Id according to the first case. FIG. 23 illustrates a waveform of a current Iq according to the first case. In FIGS. 22 and 23, the vertical axis represents the current (A).

Figure 24:
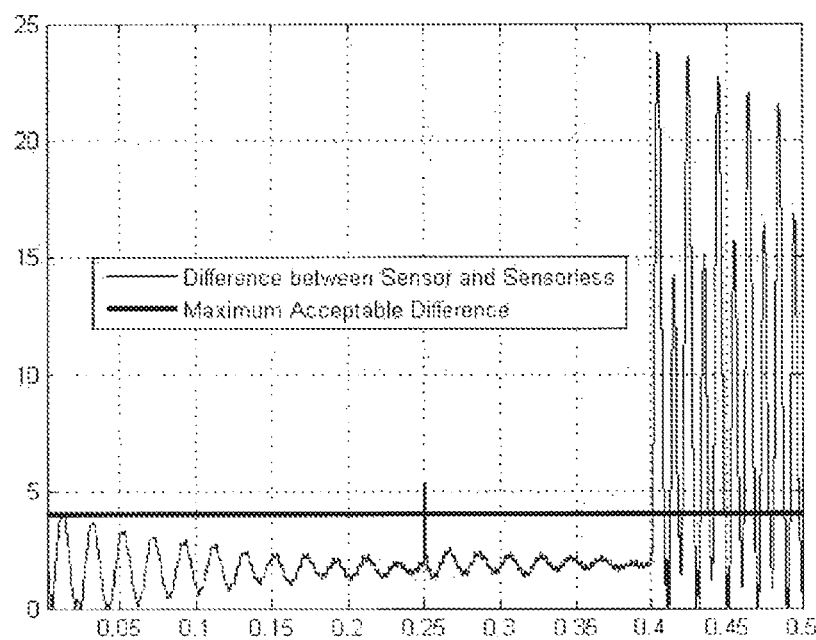
FIG. 24 is a waveform chart of an electrical angle θerror represented by an absolute value of a difference between an estimated electrical angle and an electrical angle calculated from a measured mechanical angle according to the first case.

FIG. 24 illustrates a waveform of an electrical angle θerror represented by an absolute value of a difference between an estimated electrical angle θest and an electrical angle θe calculated from a measured mechanical angle according to the first case. In FIG. 24, the vertical axis represents the electrical angle.

In FIG. 24, "Difference between Sensor and Sensorless" represents the waveform of the electrical angle θerror. Also in FIG. 24, "Maximum Acceptable Difference" represents a maximum acceptable rotor angle Errormax that is a threshold. The same things may hold true for FIGS. 30, 36, 42, 48, and 54.

Figure 25:
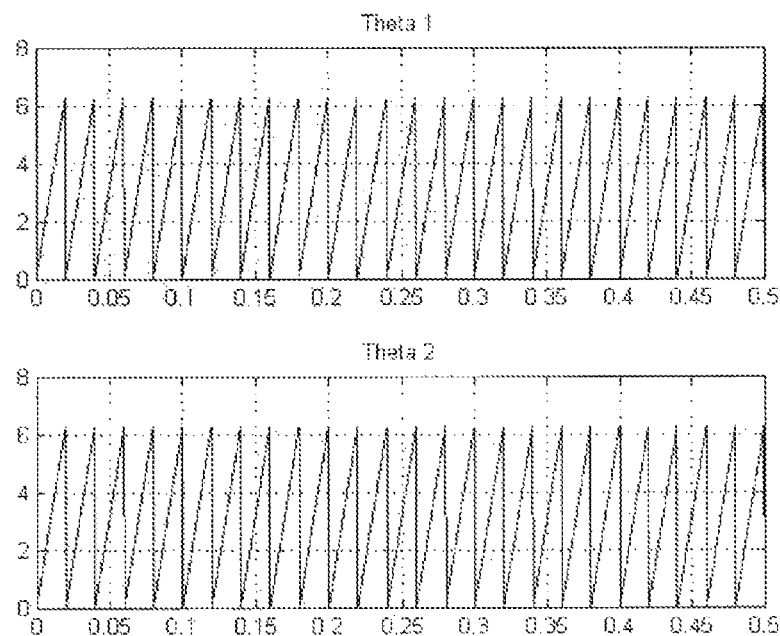
FIG. 25 is a waveform chart of rotor angles detected by two position sensors according to the first case.

FIG. 25 illustrates waveforms of rotor angles detected by the two position sensors θ1 and θ2 according to the first case. In FIG. 25, the vertical axis represents the mechanical angle of the rotor.

Figure 26:
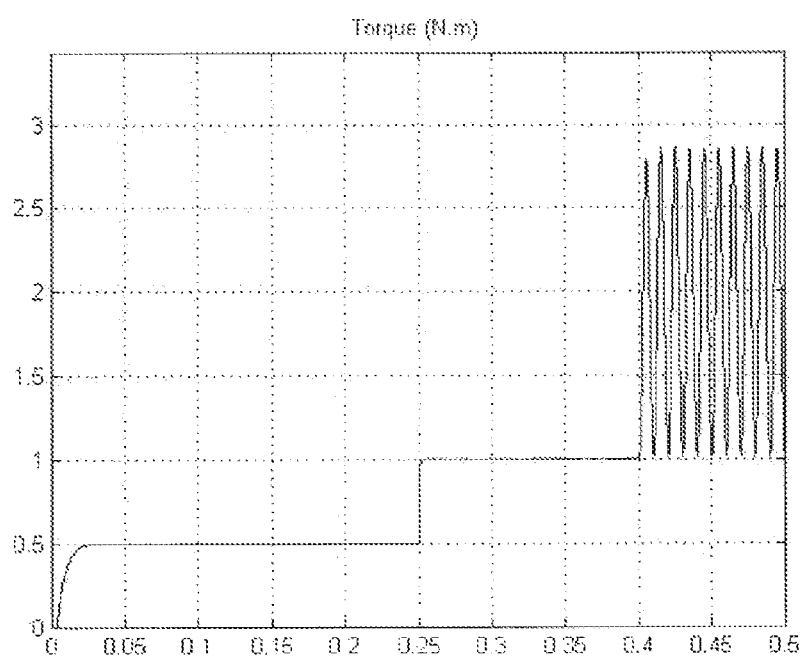
FIG. 26 is a waveform chart of a torque according to the first case.

FIG. 26 illustrates a waveform of a torque according to the first case. In FIG. 26, the vertical axis represents the torque (N·m).

In the first case, an electrical connection between the motor drive system 1000 and the current sensor I1 that detects a current value Iα is disconnected at a time of 0.4 s. This disconnection means that the current sensor I1 that detects the current value Iα fails at the time of 0.4 s. In the example illustrated in FIG. 21, the current value Iα is zero at and after the time of 0.4 s.

As illustrated in FIG. 24, before the time of 0.4 s at which the fault occurs, the electrical angle θerror falls within a range smaller than the maximum acceptable rotor angle Errormax. If the fault occurs, the electrical angle θerror exceeds the maximum acceptable rotor angle Errormax. As illustrated in FIG. 26, in addition, the torque fluctuates largely.

In the example illustrated in FIG. 24, the electrical angle θerror takes a large value at a time of 0.25 s. This phenomenon is caused by a torque fluctuation at the time of 0.25 s, and is not detected as a sensor fault. For example, detecting that the sum of the current values Ia, Ib, and Ic is substantially zero and detecting that the rotor angles θa and θb are substantially equal in value to each other enable grasping of a situation in which no sensor fault occurs. Also in the waveforms to be described later, likewise, a waveform fluctuation at a time of 0.25 s is caused by a torque fluctuation, and this phenomenon is not detected as a sensor fault.

FIGS. 27 to 32 each illustrate a result of simulation of, on condition that one of the three current sensors I1, I2, and I3 fails, detecting, identifying, and isolating the failed sensor to continuously drive the motor using a sensor other than the failed sensor. In the following description, a case of continuously driving the motor is referred to as a "second case".

Figure 27:
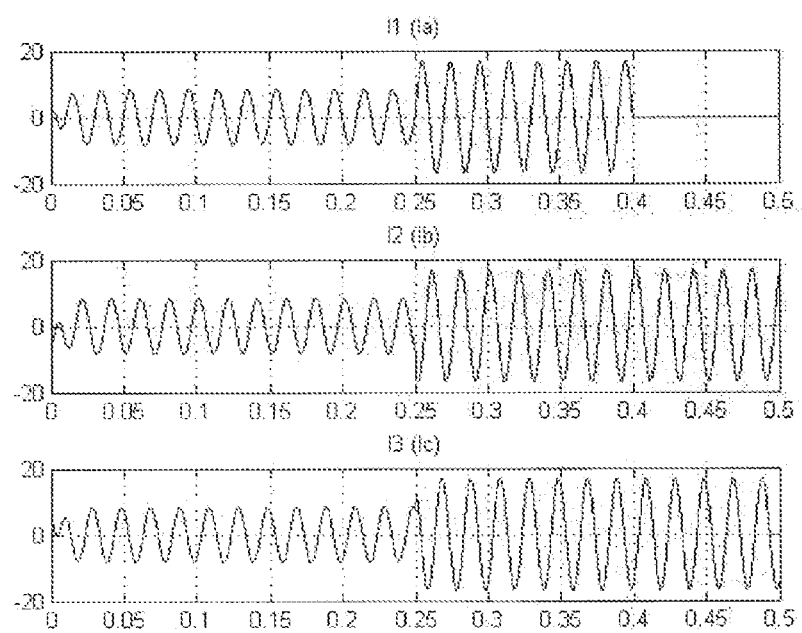
FIG. 27 is a waveform chart of currents detected by the three current sensors according to a second case.

FIG. 27 illustrates waveforms of currents detected by the current sensors I1, I2, and I3 according to the second case. In FIG. 27, the vertical axis represents the currents (A).

Figure 28:
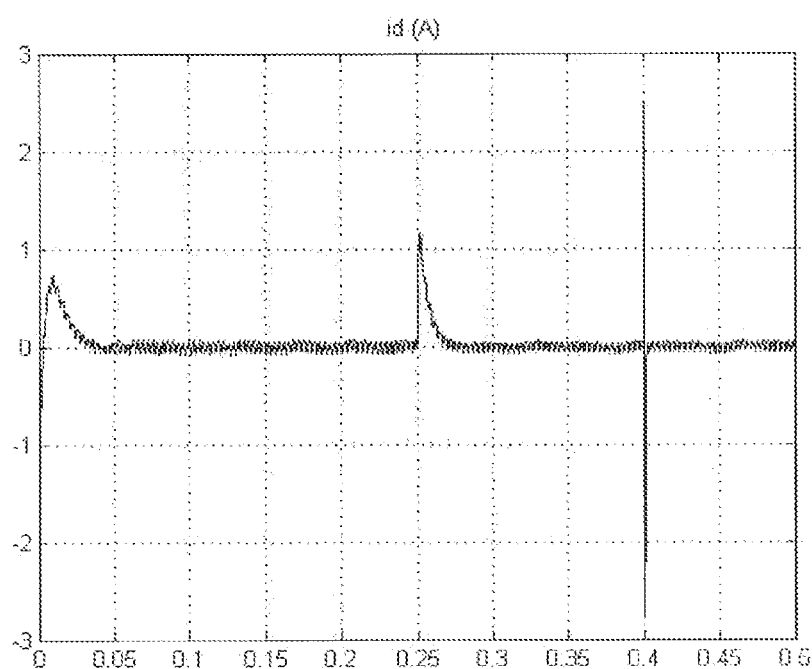
FIG. 28 is a waveform chart of a current Id according to the second case.
Figure 29:
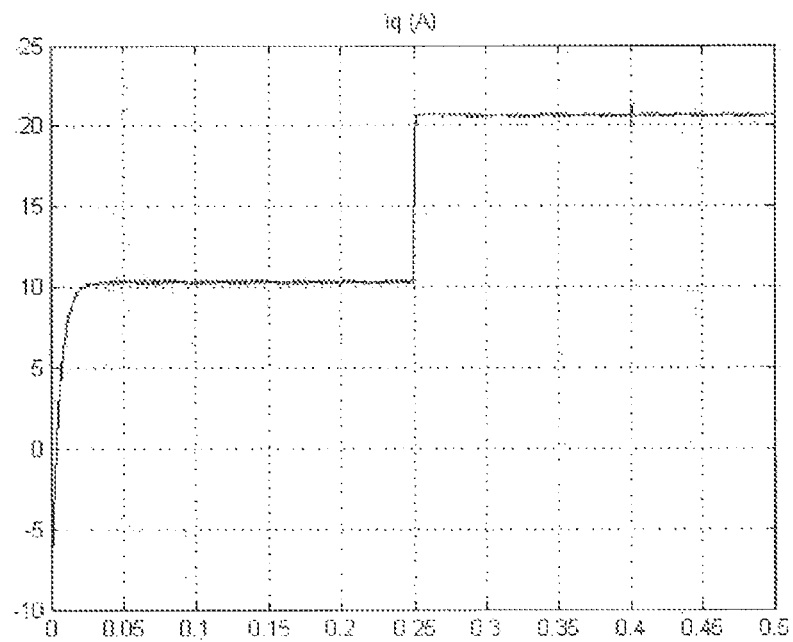
FIG. 29 is a waveform chart of a current Iq according to the second case.

FIG. 28 illustrates a waveform of a current Id according to the second case. FIG. 29 illustrates a waveform of a current Iq according to the first case. In FIGS. 28 and 29, the vertical axis represents the current (A).

Figure 30:
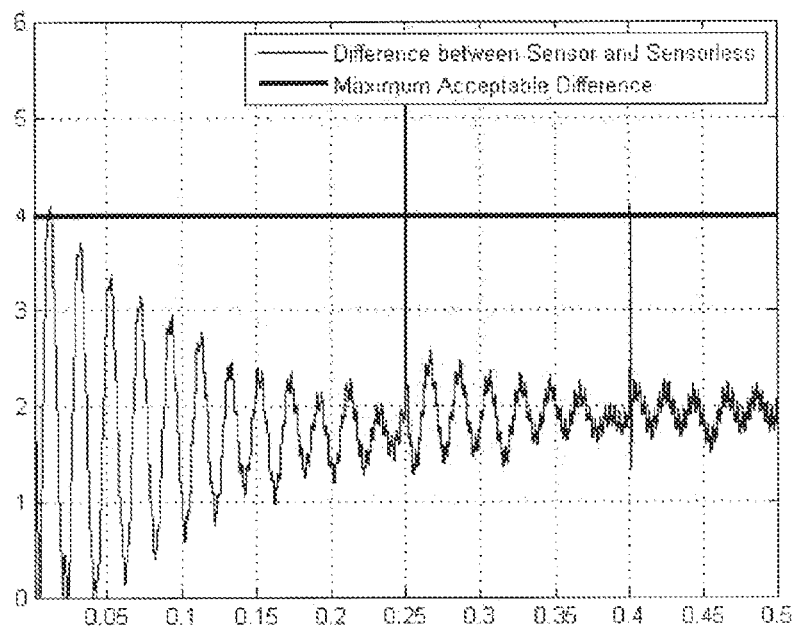
FIG. 30 is a waveform chart of an electrical angle θerror represented by an absolute value of a difference between an estimated electrical angle and an electrical angle calculated from a measured mechanical angle according to the second case.

FIG. 30 illustrates a waveform of an electrical angle θerror represented by an absolute value of a difference between an estimated electrical angle θest and an electrical angle θe calculated from a measured mechanical angle according to the second case. In FIG. 30, the vertical axis represents the electrical angle.

Figure 31:
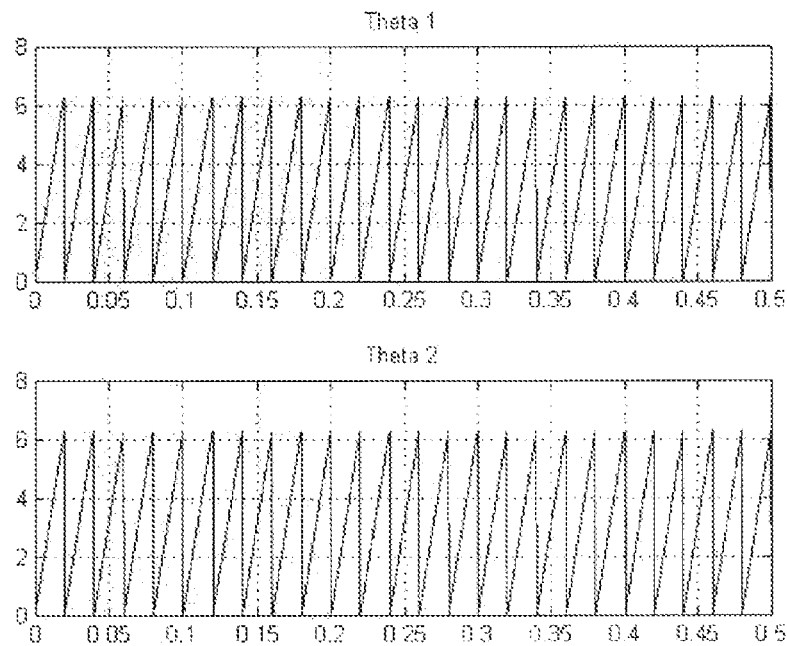
FIG. 31 is a waveform chart of rotor angles detected by the two position sensors according to the second case.

FIG. 31 illustrates waveforms of rotor angles detected by the two position sensors θ1 and θ2 according to the second case. In FIG. 31, the vertical axis represents the mechanical angle of the rotor.

Figure 32:
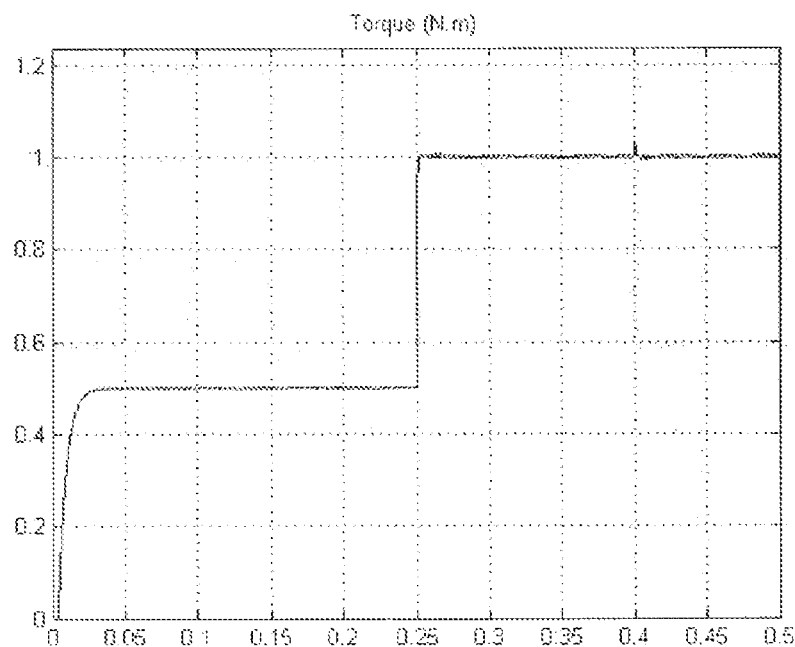
FIG. 32 is a waveform chart of a torque according to the second case.

FIG. 32 illustrates a waveform of a torque according to the second case. In FIG. 32, the vertical axis represents the torque (N·m).

In the second case, as in the first case, an electrical connection between the motor drive system 1000 and the current sensor I1 that detects a current value Iα is disconnected at a time of 0.4 s.

As illustrated in FIG. 30, the electrical angle θerror is larger than the maximum acceptable rotor angle Errormax at a time of 0.4 s at which the fault occurs. It is apparent from FIG. 30 that detecting, identifying, and isolating the failed sensor to continuously drive the motor using a sensor other than the failed sensor after the time of 0.4 s causes the electrical angle θerror to fall within a range smaller than the maximum acceptable rotor angle Errormax in a shorter period of time. It is also apparent from FIG. 32 that the torque fluctuates slightly.

With reference to FIGS. 33 to 38, a description will be given of a result of simulation on condition that one of the two position sensors θ1 and θ2 fails. In the following description, a case where such a sensor fault occurs is referred to as a "third case".

Figure 33:
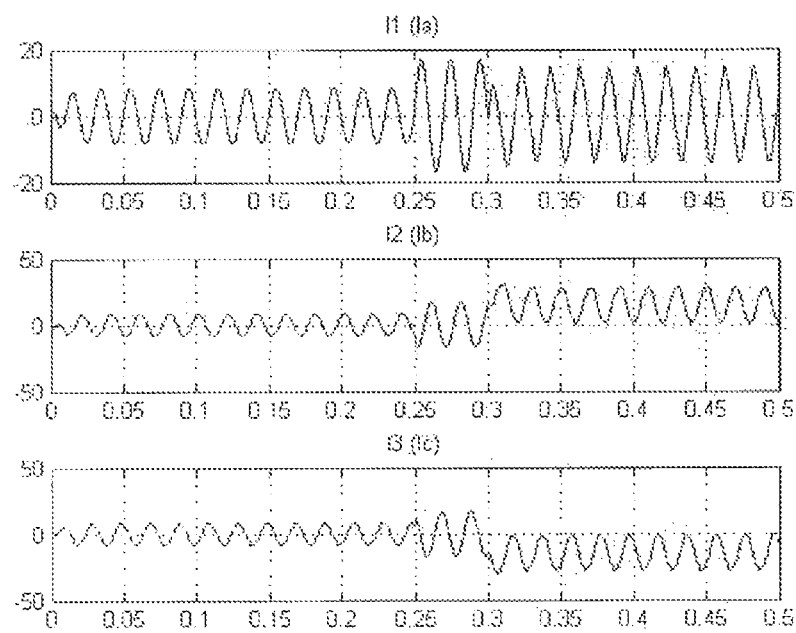
FIG. 33 is a waveform chart of currents detected by the three current sensors according to a third case.

FIG. 33 illustrates waveforms of currents detected by the current sensors I1, I2, and I3 according to the third case. In FIG. 33, the vertical axis represents the currents (A).

Figure 34:
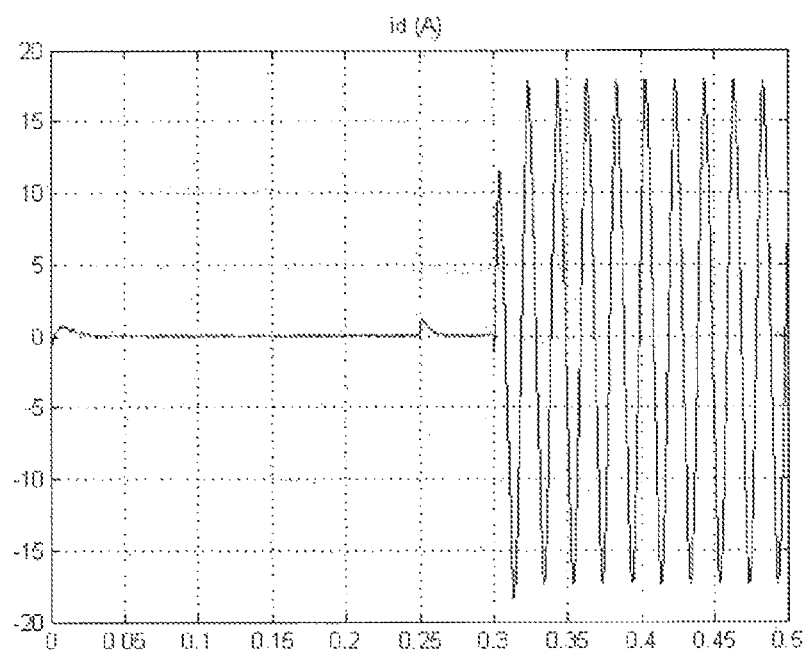
FIG. 34 is a waveform chart of a current Id according to the third case.
Figure 35:
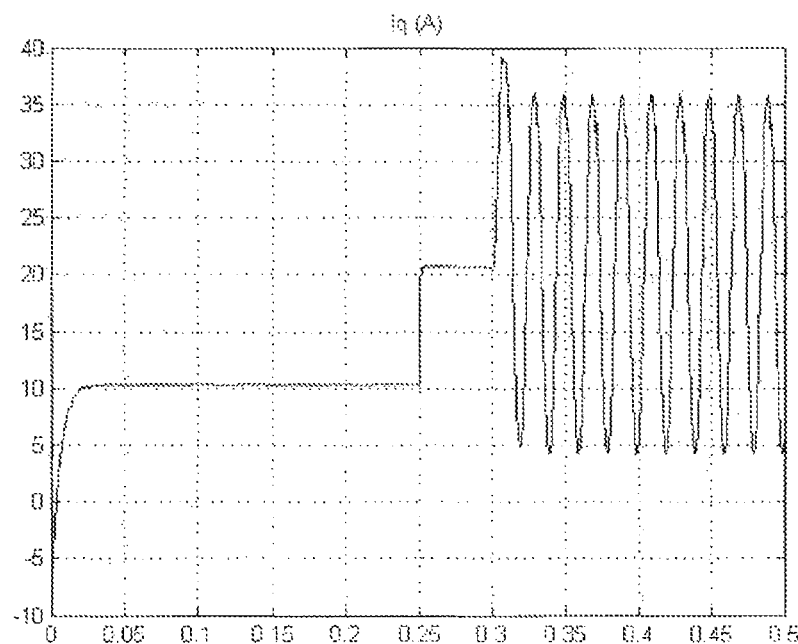
FIG. 35 is a waveform chart of a current Iq according to the third case.

FIG. 34 illustrates a waveform of a current Id according to the third case. FIG. 35 illustrates a waveform of a current Iq according to the third case. In FIGS. 34 and 35, the vertical axis represents the current (A).

Figure 36:
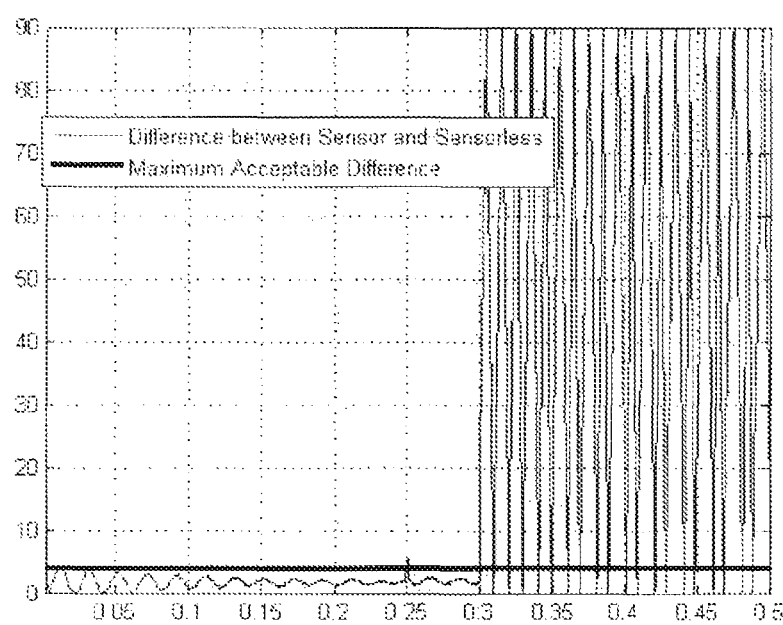
FIG. 36 is a waveform chart of an electrical angle θerror represented by an absolute value of a difference between an estimated electrical angle and an electrical angle calculated from a measured mechanical angle according to the third case.

FIG. 36 illustrates a waveform of an electrical angle θerror according to the third case. In FIG. 36, the vertical axis represents the electrical angle.

Figure 37:
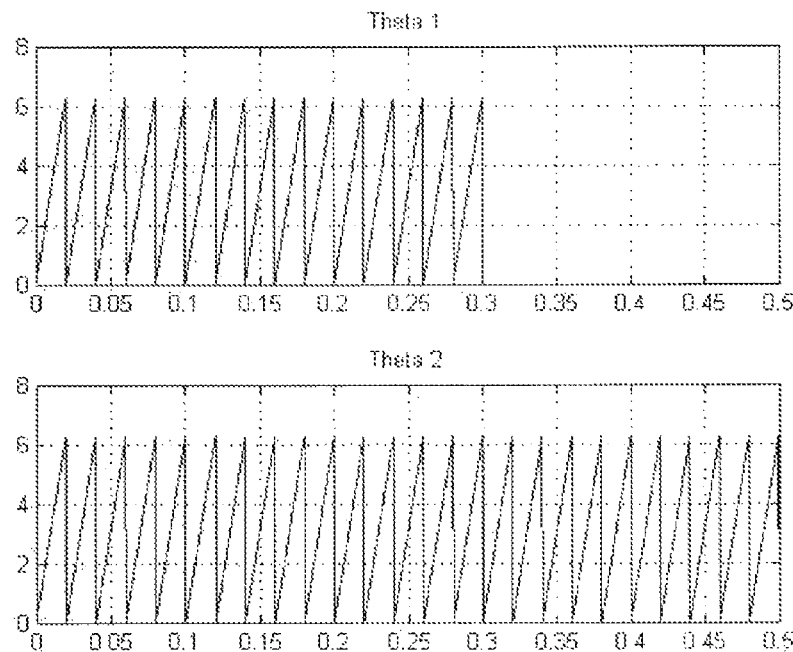
FIG. 37 is a waveform chart of rotor angles detected by the two position sensors according to the third case.

FIG. 37 illustrates waveforms of rotor angles detected by the two position sensors θ1 and θ2 according to the third case. In FIG. 37, the vertical axis represents the mechanical angle of the rotor.

Figure 38:
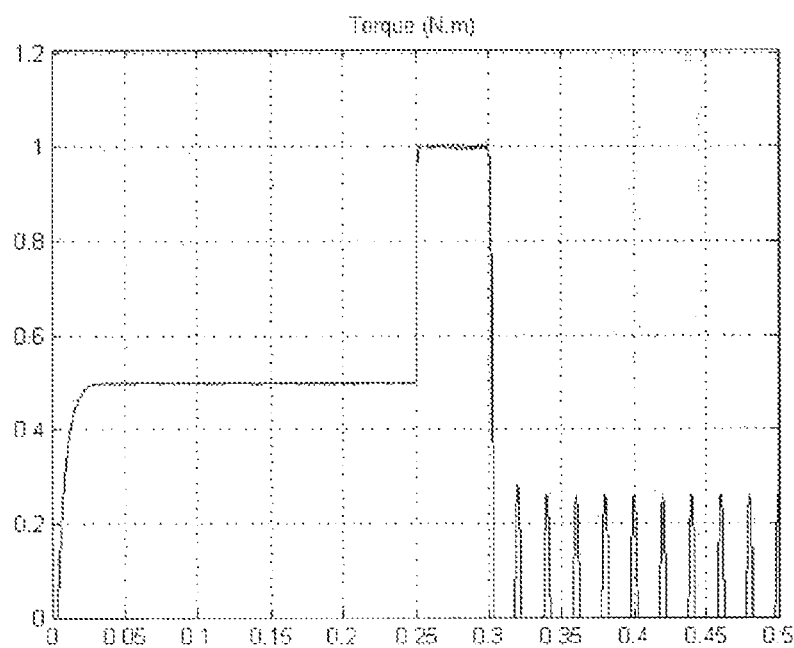
FIG. 38 is a waveform chart of a torque according to the third case.

FIG. 38 illustrates a waveform of a torque according to the third case. In FIG. 38, the vertical axis represents the torque (N·m).

In the third case, an electrical connection between the motor drive system 1000 and the position sensor θ1 is disconnected at a time of 0.3 s. This disconnection means that the position sensor θ1 fails at the time of 0.3 s. In the example illustrated in FIG. 37, the rotor angle of the position sensor θ1 is zero at and after the time of 0.3 s.

As illustrated in FIG. 36, before the time of 0.3 s at which the fault occurs, the electrical angle θerror falls within a range smaller than the maximum acceptable rotor angle Errormax. If the fault occurs, the electrical angle θerror exceeds the maximum acceptable rotor angle Errormax. As illustrated in FIG. 38, in addition, the torque fluctuates largely.

FIGS. 39 to 44 each illustrate a result of simulation of, on condition that one of the two position sensors θ1 and θ2 fails, detecting, identifying, and isolating the failed sensor to continuously drive the motor using a sensor other than the failed sensor. In the following description, a case of continuously driving the motor is referred to as a "fourth case".

Figure 39:
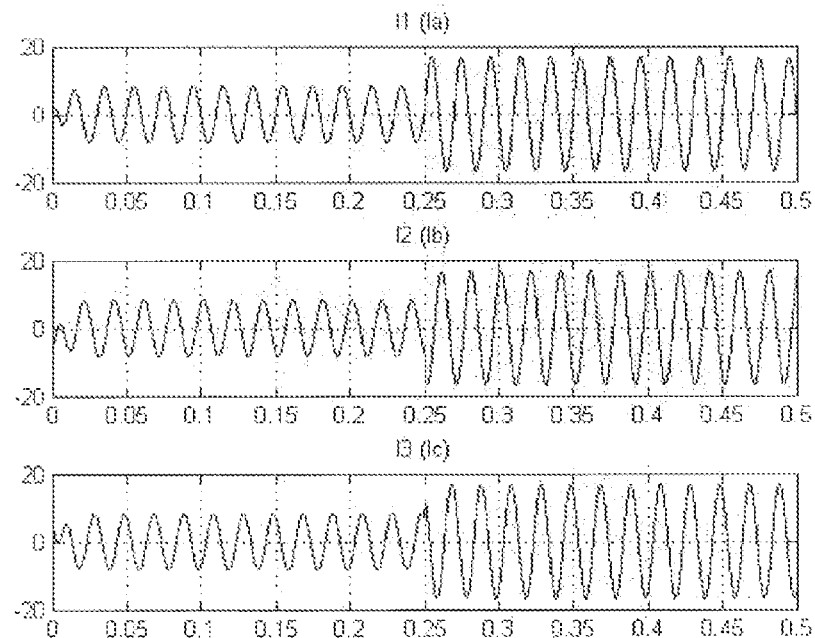
FIG. 39 is a waveform chart of currents detected by the three current sensors according to a fourth case.

FIG. 39 illustrates waveforms of currents detected by the current sensors I1, I2, and I3 according to the fourth case. In FIG. 39, the vertical axis represents the currents (A).

Figure 40:
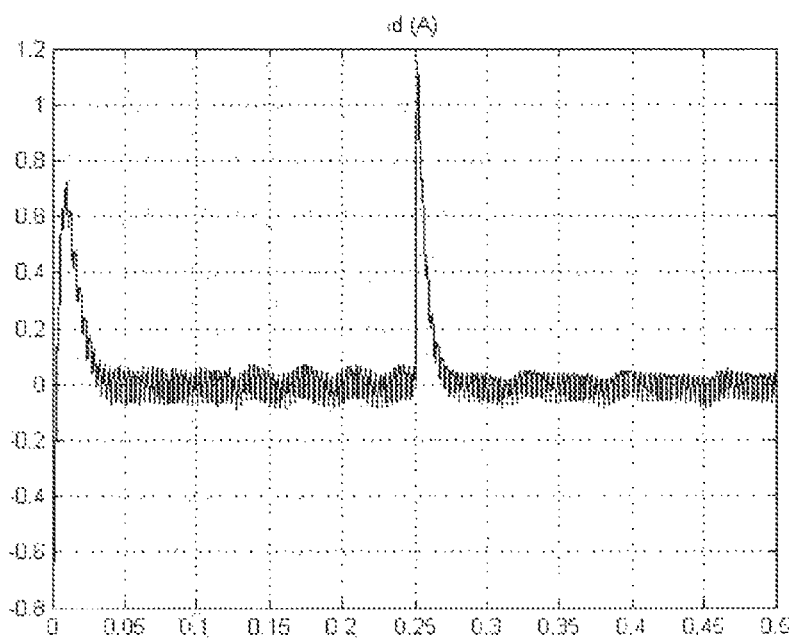
FIG. 40 is a waveform chart of a current Id according to the fourth case.
Figure 41:
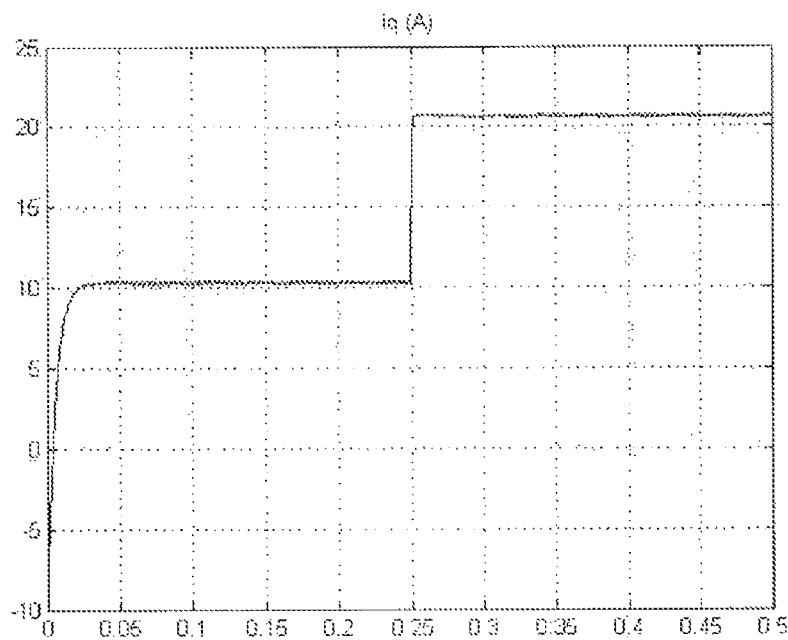
FIG. 41 is a waveform chart of a current Iq according to the fourth case.

FIG. 40 illustrates a waveform of a current Id according to the fourth case. FIG. 41 illustrates a waveform of a current Iq according to the first case. In FIGS. 40 and 41, the vertical axis represents the current (A).

Figure 42:
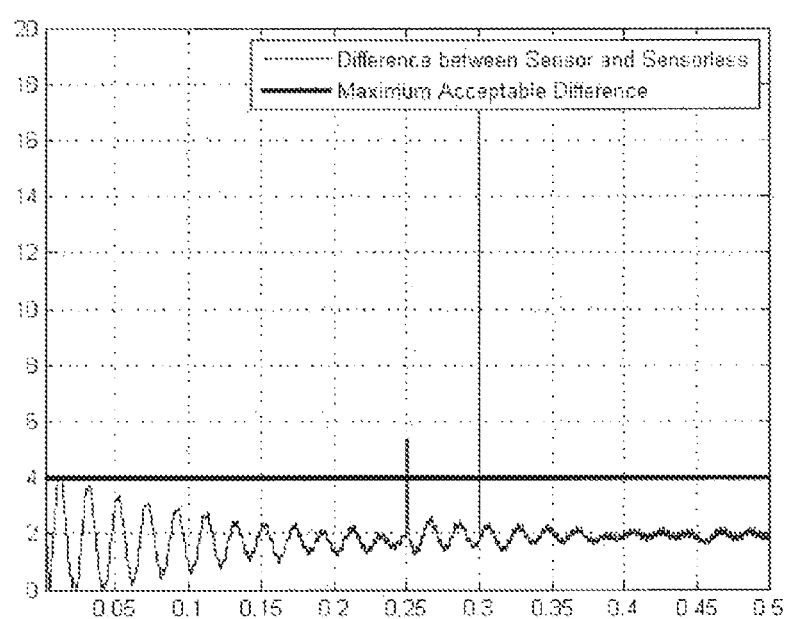
FIG. 42 is a waveform chart of an electrical angle θerror represented by an absolute value of a difference between an estimated electrical angle and an electrical angle calculated from a measured mechanical angle according to the fourth case.

FIG. 42 illustrates a waveform of an electrical angle θerror according to the fourth case. In FIG. 42, the vertical axis represents the electrical angle.

Figure 43:
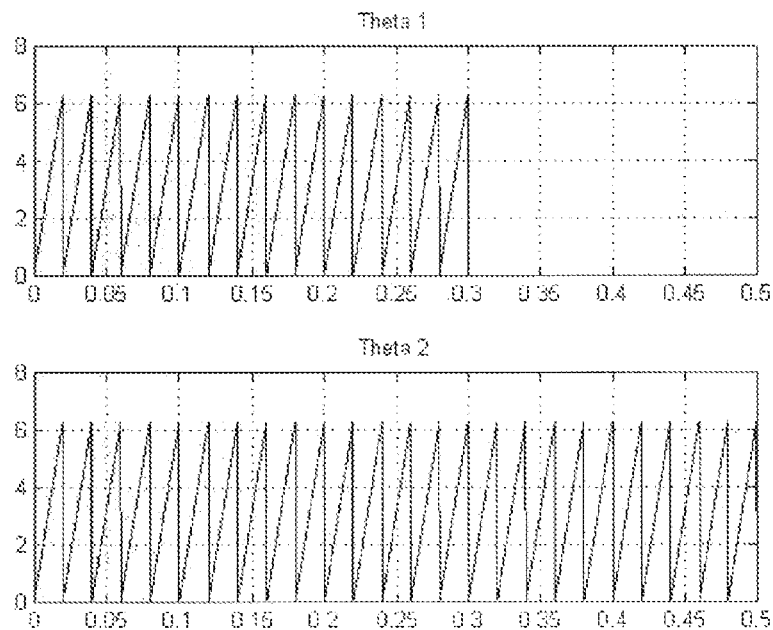
FIG. 43 is a waveform chart of rotor angles detected by the two position sensors according to the fourth case.

FIG. 43 illustrates waveforms of rotor angles detected by the two position sensors θ1 and θ2 according to the fourth case. In FIG. 43, the vertical axis represents the mechanical angle of the rotor.

Figure 44:
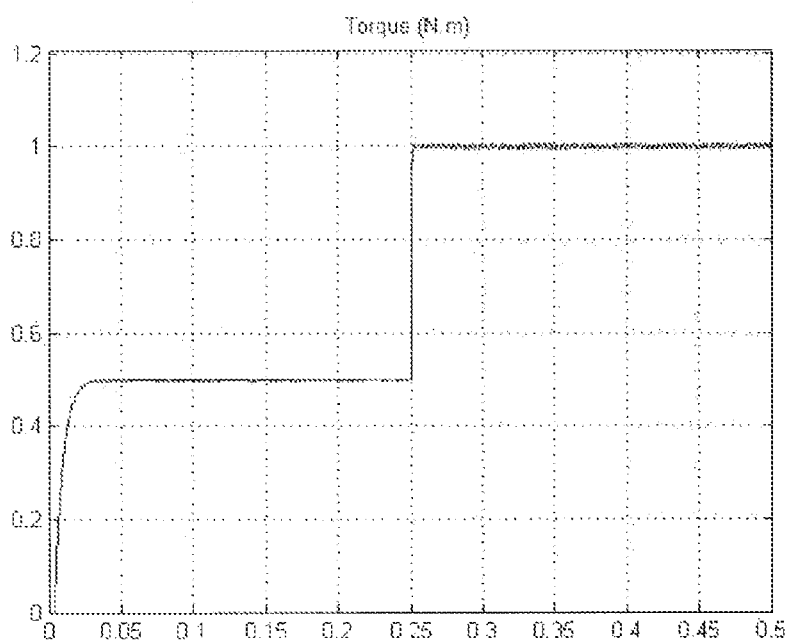
FIG. 44 is a waveform chart of a torque according to the fourth case.

FIG. 44 illustrates a waveform of a torque according to the fourth case. In FIG. 44, the vertical axis represents the torque (N·m).

In the fourth case, as in the third case, an electrical connection between the motor drive system 1000 and the position sensor θ1 is disconnected at a time of 0.3 s.

As illustrated in FIG. 42, the electrical angle θerror is larger than the maximum acceptable rotor angle Errormax at the time of 0.3 s at which the fault occurs. It is apparent from FIG. 42 that detecting, identifying, and isolating the failed sensor to continuously drive the motor using a sensor other than the failed sensor after the time of 0.3 s causes the electrical angle θerror to fall within a range smaller than the maximum acceptable rotor angle Errormax in a shorter period of time. It is also apparent from FIG. 44 that the torque fluctuates slightly.

With reference to FIGS. 45 to 50, a description will be given of a result of simulation on condition that both of a current sensor and a position sensor fail. In the following description, a case where such a sensor fault occurs is referred to as a "fifth case"

Figure 45:
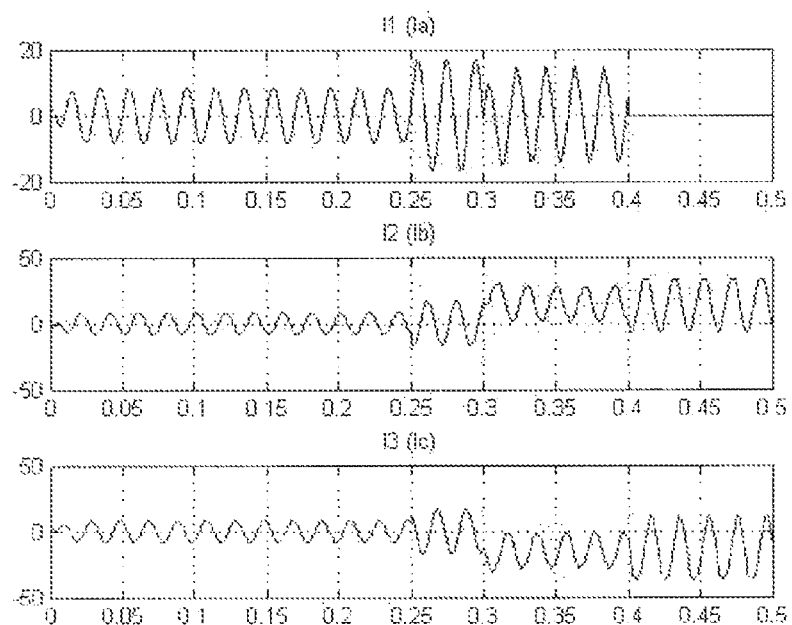
FIG. 45 is a waveform chart of currents detected by the three current sensors according to a fifth case.

FIG. 45 illustrates waveforms of currents detected by the current sensors I1, I2, and I3 according to the fifth case. In FIG. 45, the vertical axis represents the currents (A).

Figure 46:
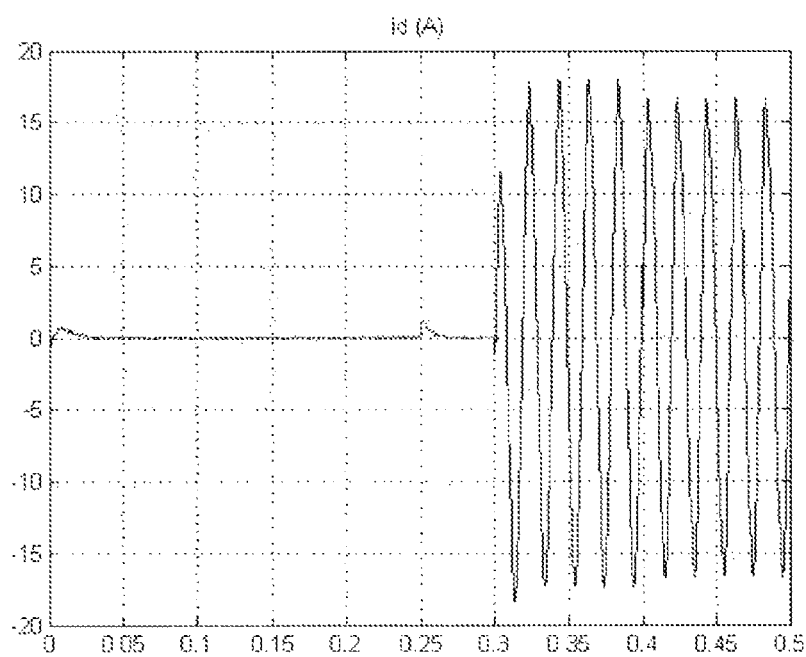
FIG. 46 is a waveform chart of a current Id according to the fifth case.
Figure 47:
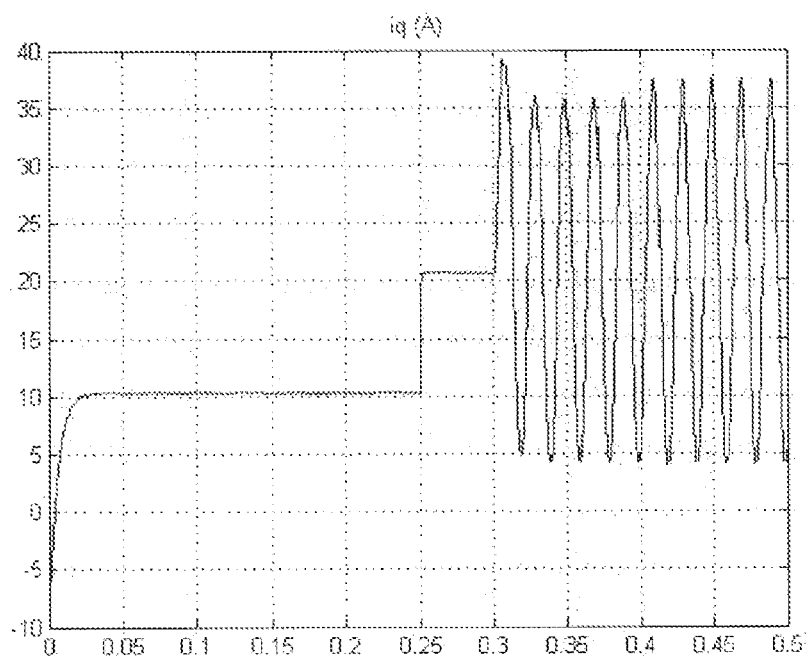
FIG. 47 is a waveform chart of a current Iq according to the fifth case.

FIG. 46 illustrates a waveform of a current Id according to the fifth case. FIG. 47 illustrates a waveform of a current Iq according to the fifth case. In FIGS. 46 and 47, the vertical axis represents the current (A).

Figure 48:
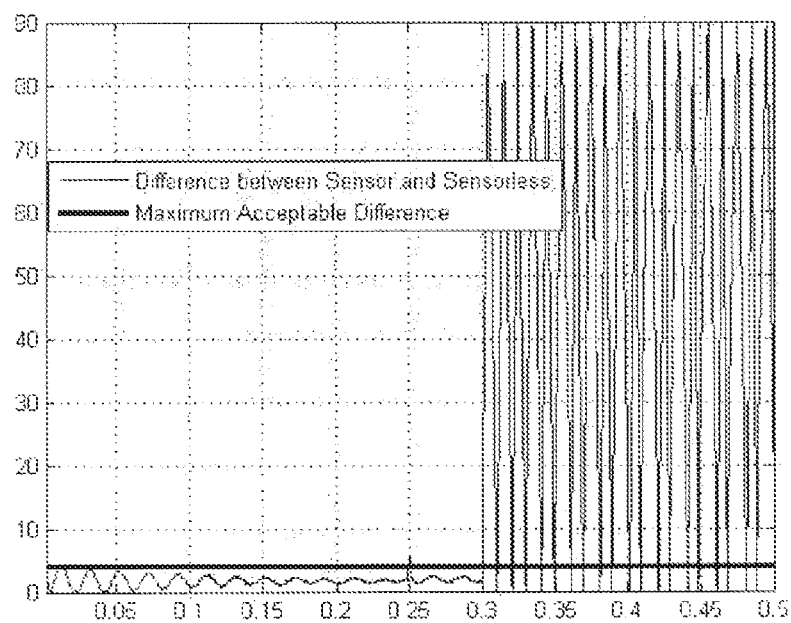
FIG. 48 is a waveform chart of an electrical angle θerror represented by an absolute value of a difference between an estimated electrical angle and an electrical angle calculated from a measured mechanical angle according to the fifth case.

FIG. 48 illustrates a waveform of an electrical angle θerror according to the fifth case. In FIG. 48, the vertical axis represents the electrical angle.

Figure 49:
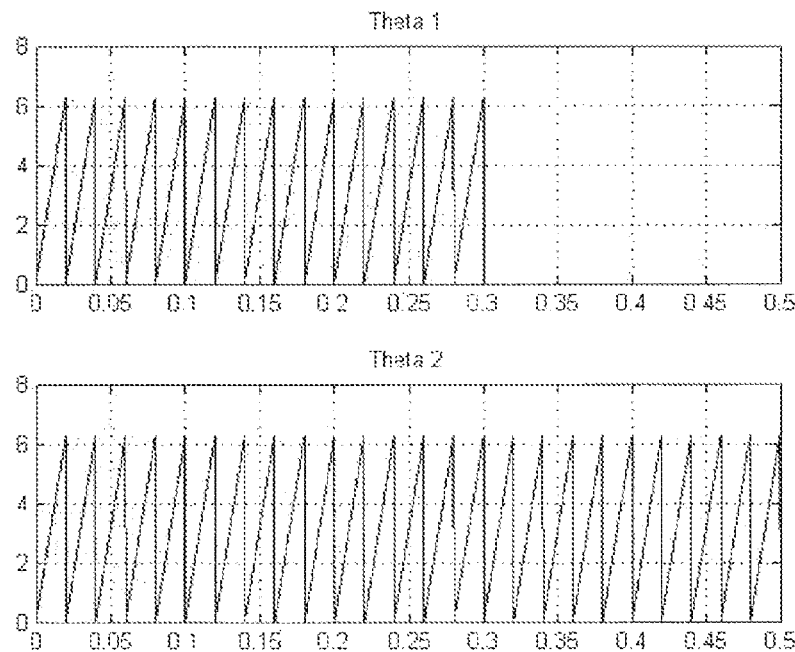
FIG. 49 is a waveform chart of rotor angles detected by the two position sensors according to the fifth case.

FIG. 49 illustrates waveforms of rotor angles detected by the two position sensors θ1 and θ2 according to the fifth case. In FIG. 49, the vertical axis represents the mechanical angles of the rotor.

Figure 50:
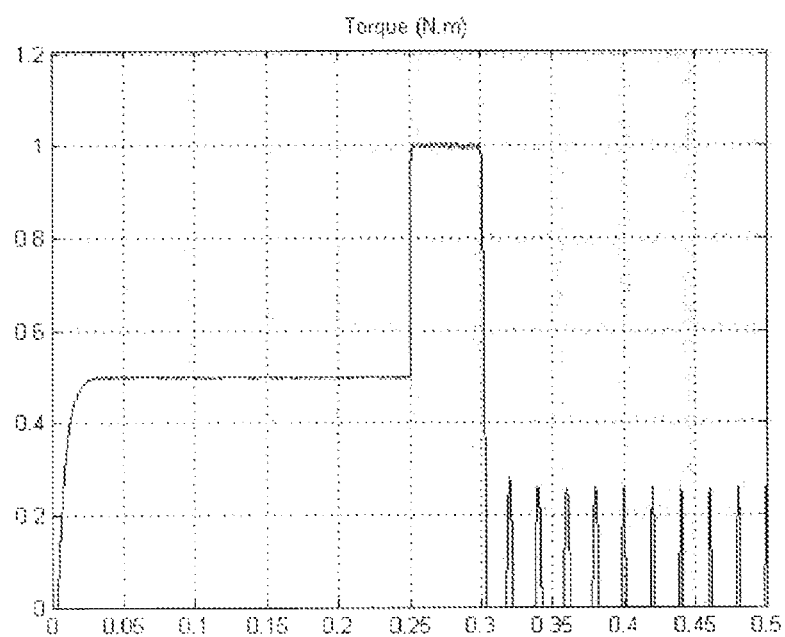
FIG. 50 is a waveform chart of a torque according to the fifth case.

FIG. 50 illustrates a waveform of a torque according to the fifth case. In FIG. 50, the vertical axis represents the torque (N·m).

In the fifth case, first, the position sensor θ1 fails at a time of 0.3 s. In the example illustrated in FIG. 49, the rotor angle of the position sensor θ1 is zero at and after the time of 0.3 s. Next, the current sensor I1 fails at a time of 0.4 s. In the example illustrated in FIG. 45, the current value Iα is zero at and after the time of 0.4 s.

As illustrated in FIG. 48, before the time of 0.3 s at which the position sensor θ1 fails, the electrical angle θerror falls within a range smaller than the maximum acceptable rotor angle Errormax. If the fault occurs, the electrical angle θerror exceeds the maximum acceptable rotor angle Errormax. As illustrated in FIG. 50, in addition, the torque fluctuates largely.

FIGS. 51 to 56 each illustrate a result of simulation of, on condition that both of a current sensor and a position sensor fail, detecting, identifying, and isolating the failed sensors to continuously drive the motor using a sensor other than the failed sensors. In the following description, a case of continuously driving the motor is referred to as a "sixth case".

Figure 51:
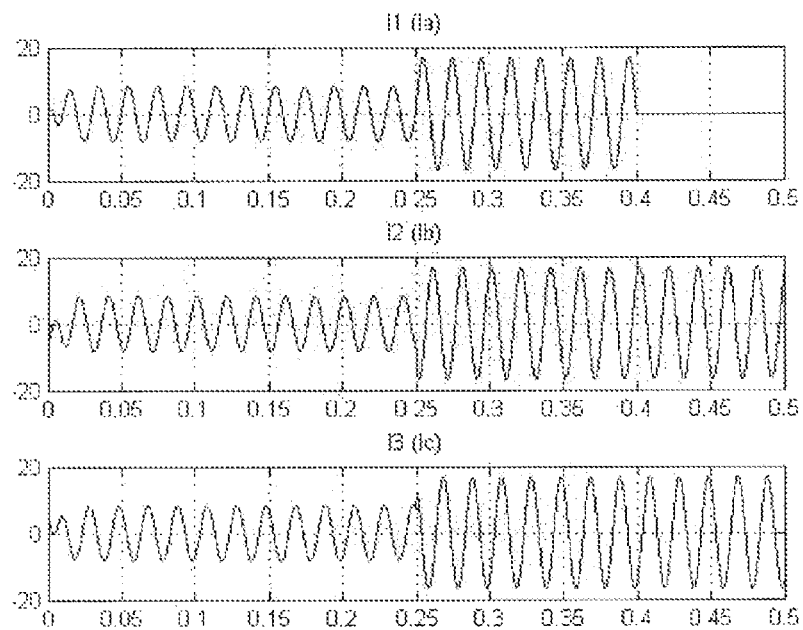
FIG. 51 is a waveform chart of currents detected by the three current sensors according to a sixth case.

FIG. 51 illustrates waveforms of currents detected by the current sensors I1, I2, and I3 according to the sixth case. In FIG. 51, the vertical axis represents the currents (A).

Figure 52:
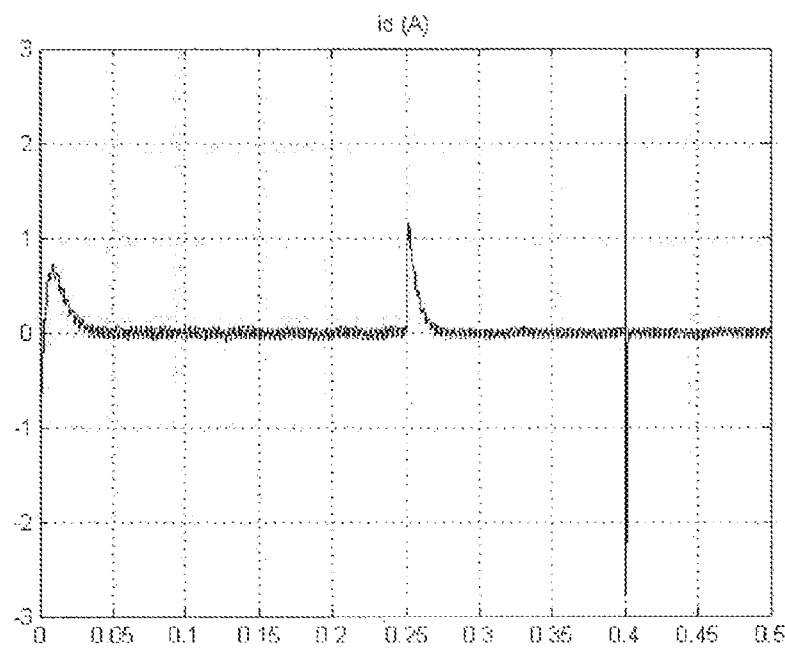
FIG. 52 is a waveform chart of a current Id according to the sixth case.
Figure 53:
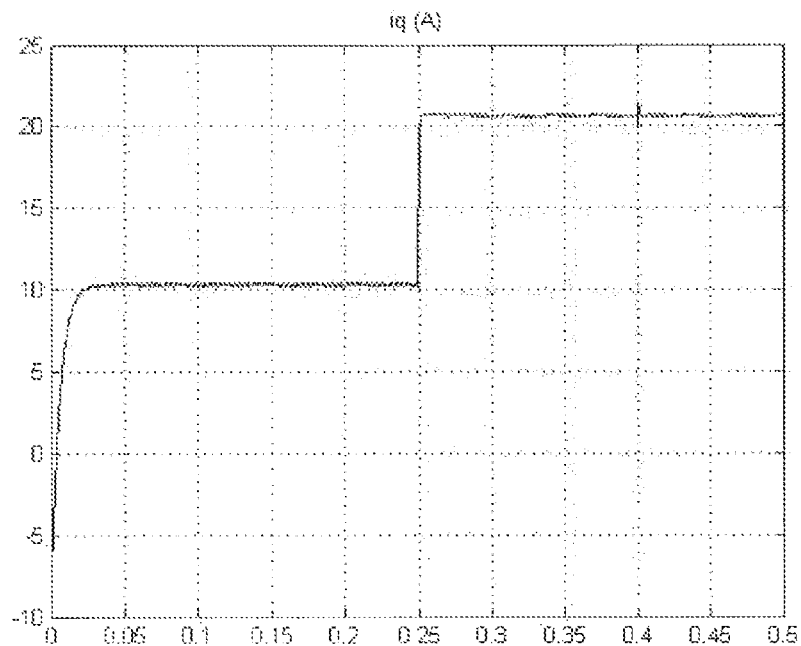
FIG. 53 is a waveform chart of a current Iq according to the sixth case.

FIG. 52 illustrates a waveform of a current Id according to the sixth case. FIG. 53 illustrates a waveform of a current Iq according to the first case. In FIGS. 52 and 53, the vertical axis represents the current (A).

Figure 54:
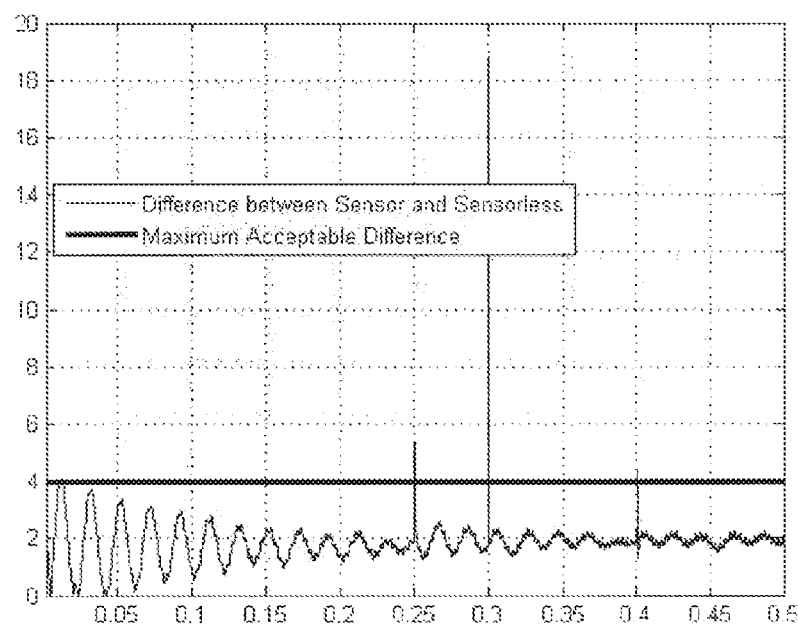
FIG. 54 is a waveform chart of an electrical angle θerror represented by an absolute value of a difference between an estimated electrical angle and an electrical angle calculated from a measured mechanical angle according to the sixth case.

FIG. 54 illustrates a waveform of an electrical angle θerror according to the sixth case. In FIG. 54, the vertical axis represents the electrical angle.

Figure 55:
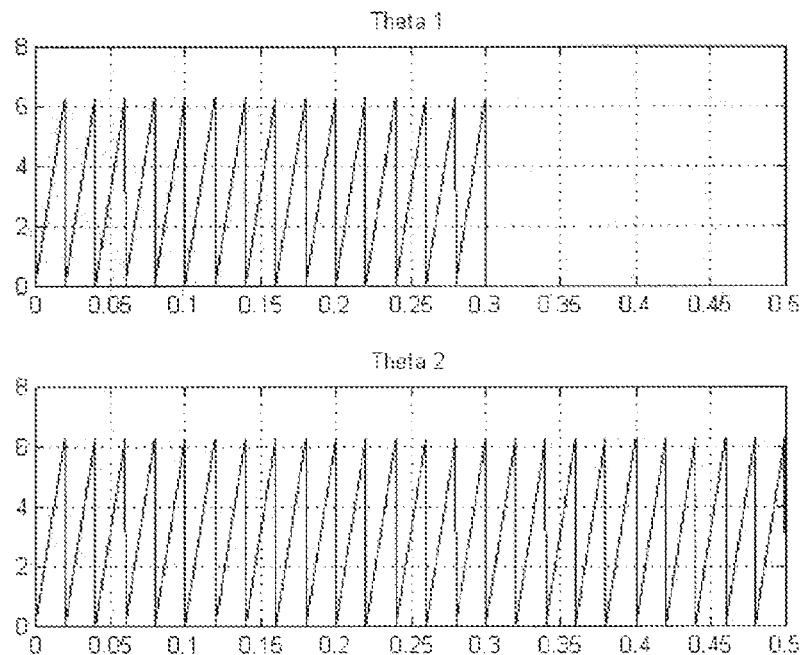
FIG. 55 is a waveform chart of rotor angles detected by the two position sensors according to the sixth case.

FIG. 55 illustrates waveforms of rotor angles detected by the two position sensors θ1 and θ2 according to the sixth case. In FIG. 55, the vertical axis represents the mechanical angles of the rotor.

Figure 56:
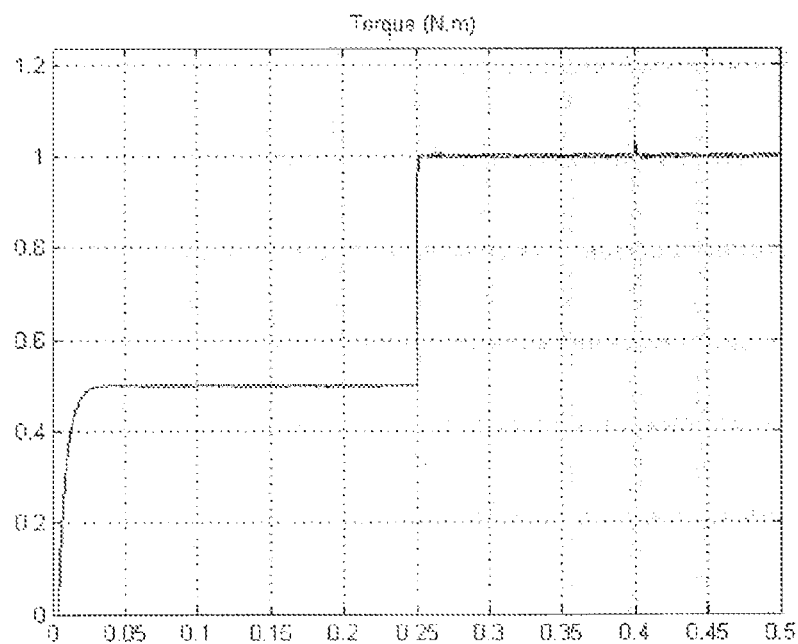
FIG. 56 is a waveform chart of a torque according to the sixth case.

FIG. 56 illustrates a waveform of a torque according to the sixth case. In FIG. 56, the vertical axis represents the torque (N·m).

In the sixth case, as in the fifth case, first, the position sensor θ1 fails at a time of 0.3 s. Next, the current sensor I1 fails at a time of 0.4 s.

As illustrated in FIG. 54, the electrical angle θerror is larger than the maximum acceptable rotor angle Errormax at the time of 0.3 s at which the position sensor θ1 fails. It is apparent from FIG. 54 that detecting, identifying, and isolating the failed sensor to continuously drive the motor using a sensor other than the failed sensor after the time of 0.3 s causes the electrical angle θerror to fall within a range smaller than the maximum acceptable rotor angle Errormax in a shorter period of time. In addition, the electrical angle θerror is larger than the maximum acceptable rotor angle Errormax at the time of 0.4 s at which the current sensor I1 fails. It is apparent from FIG. 54 that detecting, identifying, and isolating the failed sensor to continuously drive the motor using a sensor other than the failed sensor after the time of 0.4 s causes the electrical angle θerror to fall within a range smaller than the maximum acceptable rotor angle Errormax in a shorter period of time. It is also apparent from FIG. 56 that the torque fluctuates slightly.

An embodiment of the present disclosure is suitably applicable to a motor drive system for a shift-by-wire motor, a steering-by-wire motor, a brake-by-wire motor, a traction motor, and the like each requiring an ability to detect a sensor fault. For example, a motor drive system according to an embodiment of the present disclosure is installable in a self-driving car compliant with Levels 0 to 4 (standards of automation) prescribed by the Japanese Government and the National Highway Traffic Safety Administration (NHTSA) of the United States Department of Transportation.

An embodiment of the present disclosure is widely applicable to a variety of apparatuses equipped with various motors, such as a vacuum cleaner, a dryer, a ceiling fan, a washing machine, a refrigerator, and an electric power steering system.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A method for controlling a motor, the method comprising:
   (A) acquiring three current values Ia, Ib, and Ic of three-phase currents flowing through the motor, the three current values Ia, Ib, and Ic being detected by three current sensors, and two rotor angles θa and θb of the motor, the two rotor angles θa and θb being detected by two position sensors;
   (B) performing six ways of calculation using two of the three current values Ia, Ib, and Ic and one of the two rotor angles θa and θb;
   (C) identifying at least one failed sensor from among the current sensors and the position sensors, using a table showing a relationship between a failed sensor and a pattern of a result of each of the six ways of calculation;

(D) selecting, as a normal sensor, a sensor different from the at least one failed sensor identified; and (E) controlling the motor, using the normal sensor selected.

2. The motor control method according to claim 1, wherein when the failed sensor is present, a result of calculation using a current value or a rotor angle detected by the failed sensor among the six ways of calculation is abnormal.

3. The motor control method according to claim 2, wherein a result of calculation using a current value and a rotor angle detected by sensors different from the failed sensor among the six ways of calculation is normal.

4. The motor control method according to claim 2, wherein the identifying step (C) includes (c1) identifying, as a failed sensor, a sensor detecting a current value or a rotor angle used for all abnormal results of calculation among the six ways of calculation.

5. The motor control method according to claim 1, wherein
each of the two rotor angles θa and θb detected by the two position sensors is a mechanical angle; and
each of the six ways of calculation (B) includes:
calculating an electrical angle θest, using two of the three current values Ia, Ib, and Ic;
converting one of the two rotor angles θa and θb into an electrical angle θe; and
outputting an error signal indicating an abnormal result when an absolute value of a difference between the electrical angle θest and the electrical angle θe is equal to or more than a predetermined value.

6. The motor control method according to claim 1, wherein when one of the current sensors is identified as a failed sensor, the selecting step (D) includes (d1) selecting, as a normal sensor, a current sensor different from the current sensor identified as the failed sensor.

7. The motor control method according to claim 1, wherein when one of the position sensors is identified as a failed sensor, the selecting step (D) includes (d2) selecting, as a normal sensor, a position sensor different from the position sensor identified as the failed sensor.

8. The method according to claim 1, further comprising generating a notification signal for notifying a human when at least one of the current sensors and the position sensors is identified as a failed sensor.

9. The motor control method according to claim 1, further comprising stopping the motor when two of the three current sensors are each identified as a failed sensor.

10. The motor control method according to claim 1, further comprising stopping the motor when all the position sensors are each identified as a failed sensor.

11. A motor drive system comprising:
a motor;
three current sensors to respectively detect current values of three-phase currents flowing through the motor;
two position sensors to respectively detect rotor angles of the motor; and
a control circuit to control the motor; wherein
the control circuit acquires the three current values Ia, Ib, and Ic of the three-phase currents flowing through the motor, the three current values Ia, Ib, and Ic being detected by the three current sensors, and the two rotor angles θa and θb of the motor, the two rotor angles θa and θb being detected by two position sensors;
the control circuit performs six ways of calculation using two of the three current values Ia, Ib, and Ic and one of the two rotor angles θa and θb;
the control circuit identifies at least one failed sensor from among the current sensors as well as the position sensors, using a table showing a relationship between a failed sensor and a pattern of a result of each of the six ways of calculation;
the control circuit selects, as a normal sensor, a sensor different from the at least one failed sensor identified; and
the control circuit controls the motor, using the normal sensor selected.

12. An electric power steering system comprising:
the motor drive system according to claim 11.

* * * * *